(12) United States Patent
Yoshimura

(10) Patent No.: US 8,526,777 B2
(45) Date of Patent: Sep. 3, 2013

(54) MOVING IMAGE RECORDING METHOD AND INFORMATION PROCESSING DEVICE

(75) Inventor: Hiroshi Yoshimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 915 days.

(21) Appl. No.: 12/585,963

(22) Filed: Sep. 29, 2009

(65) Prior Publication Data
US 2010/0092157 A1    Apr. 15, 2010

Related U.S. Application Data

(63) Continuation of application No. PCT/JP2007/057259, filed on Mar. 30, 2007.

(51) Int. Cl.
*H04N 5/91* (2006.01)
(52) U.S. Cl.
USPC .......................................................... 386/212
(58) Field of Classification Search
None
See application file for complete search history.

(56) References Cited

U.S. PATENT DOCUMENTS

| | | | |
|---|---|---|---|
| 7,664,057 B1 * | 2/2010 | Wu et al. ........................ | 370/260 |
| 2003/0002578 A1 * | 1/2003 | Tsukagoshi et al. ..... | 375/240.01 |
| 2004/0199659 A1 * | 10/2004 | Ishikawa et al. ............... | 709/235 |
| 2005/0078196 A1 | 4/2005 | Okamoto | |
| 2005/0180341 A1 * | 8/2005 | Nelson et al. .................. | 370/260 |

FOREIGN PATENT DOCUMENTS

| | | |
|---|---|---|
| JP | 7-95522 | 4/1995 |
| JP | 2005-65110 | 3/2005 |
| JP | 2005-117447 | 4/2005 |

OTHER PUBLICATIONS

International Search Report for PCT/JP2007/057259, mailed Jul. 10, 2007.

* cited by examiner

*Primary Examiner* — Thai Tran
*Assistant Examiner* — Sunghyoun Park
(74) *Attorney, Agent, or Firm* — Staas & Halsey LLP

(57) ABSTRACT

A video information item obtained by photographing and an audio information item obtained by recording are digitized to obtain a digitized video data item and a digitized audio data item each accompanied by a time information item, respectively. The digitized video data item is stored in such a manner as to be separated into the time information item and the digitized video data item. The digitized audio data item is stored in such a manner as to be separated into the time information item and the digitized audio data item. The separately-stored time information item and the digitized video data item and the separately-stored time information item and the digitized audio data item are combined in synchronization with each other. The combined time information items, the digitized video data item, and the digitized audio data item are stored in a predetermined format.

10 Claims, 15 Drawing Sheets

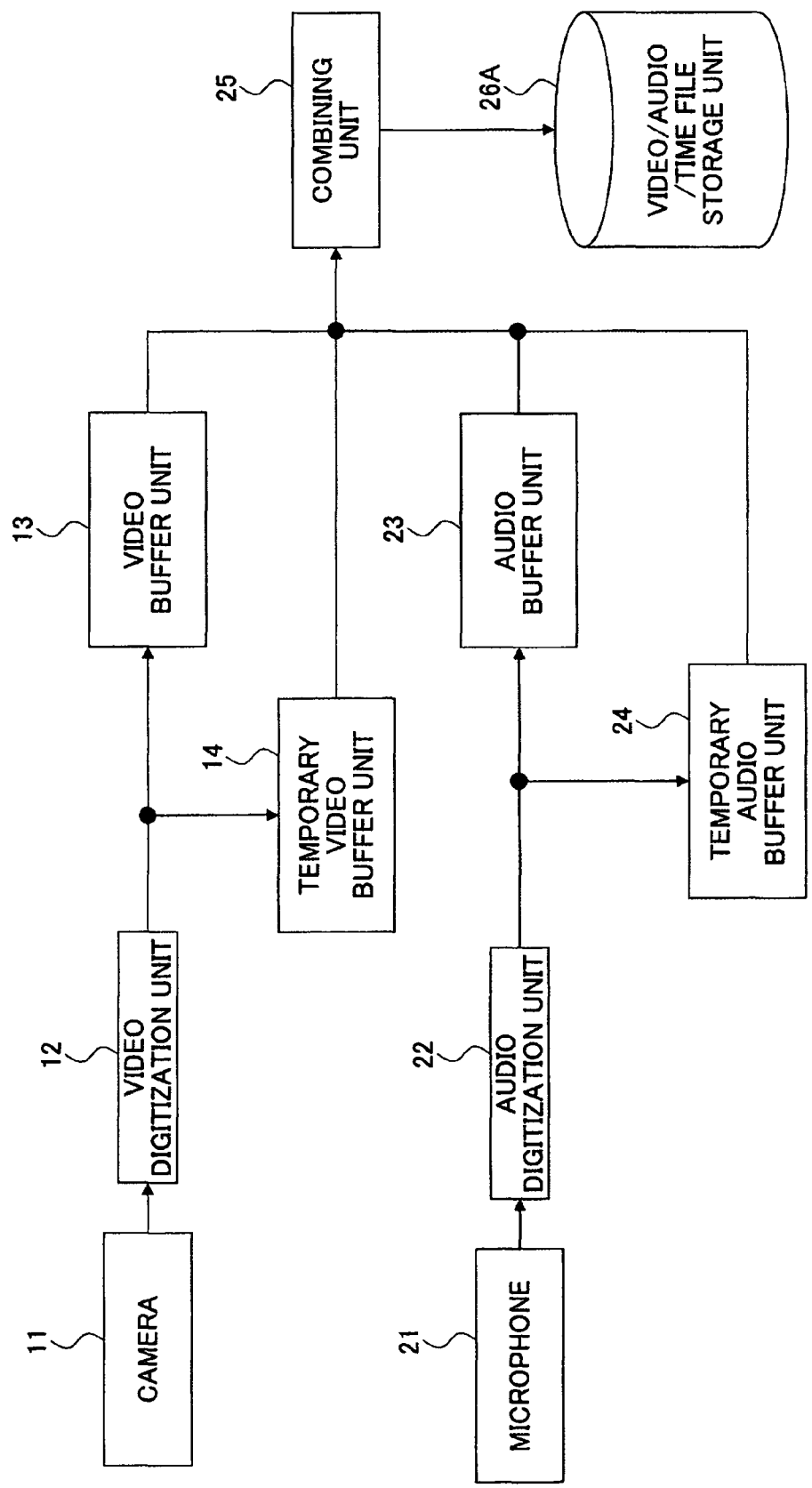

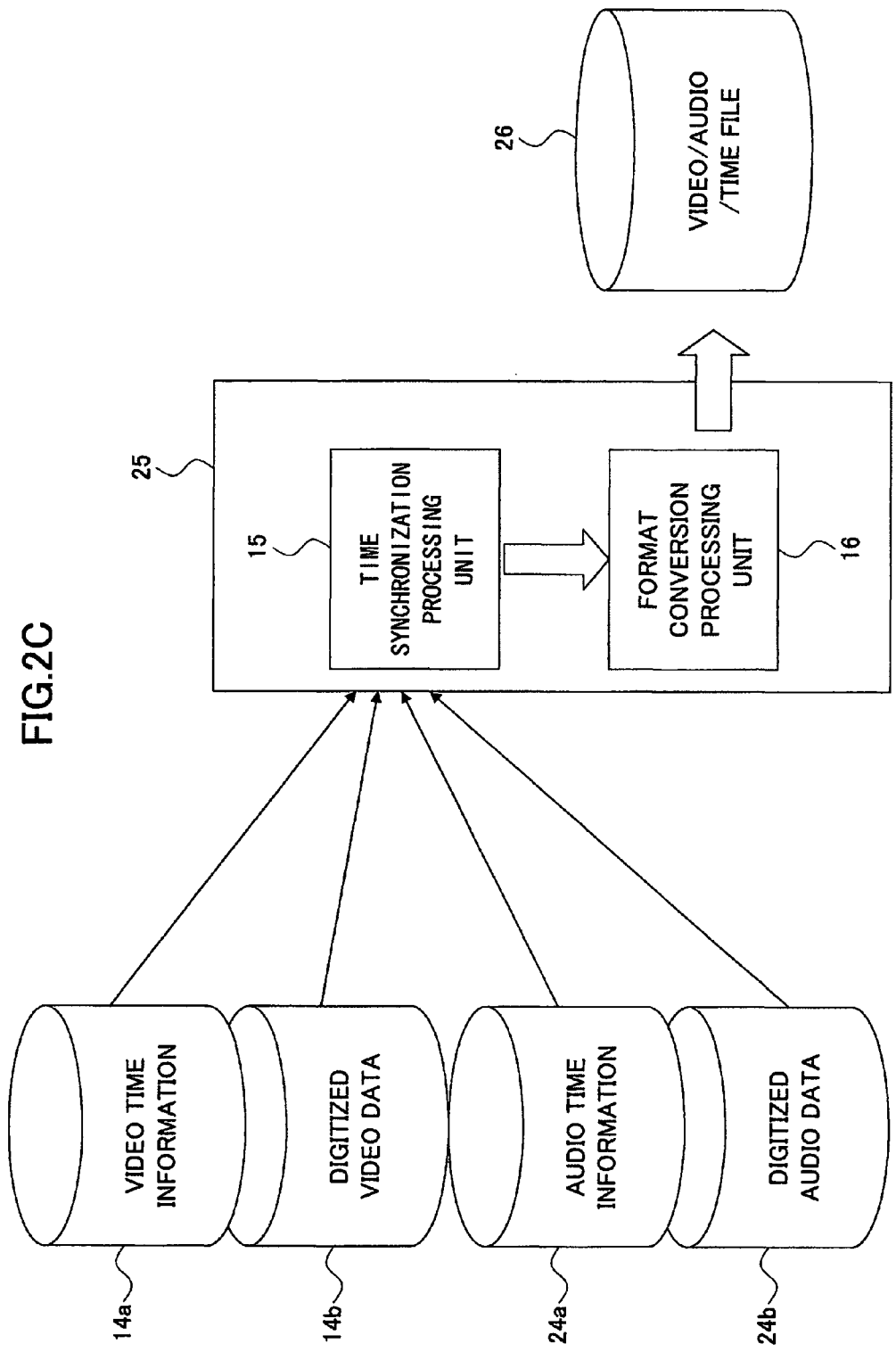

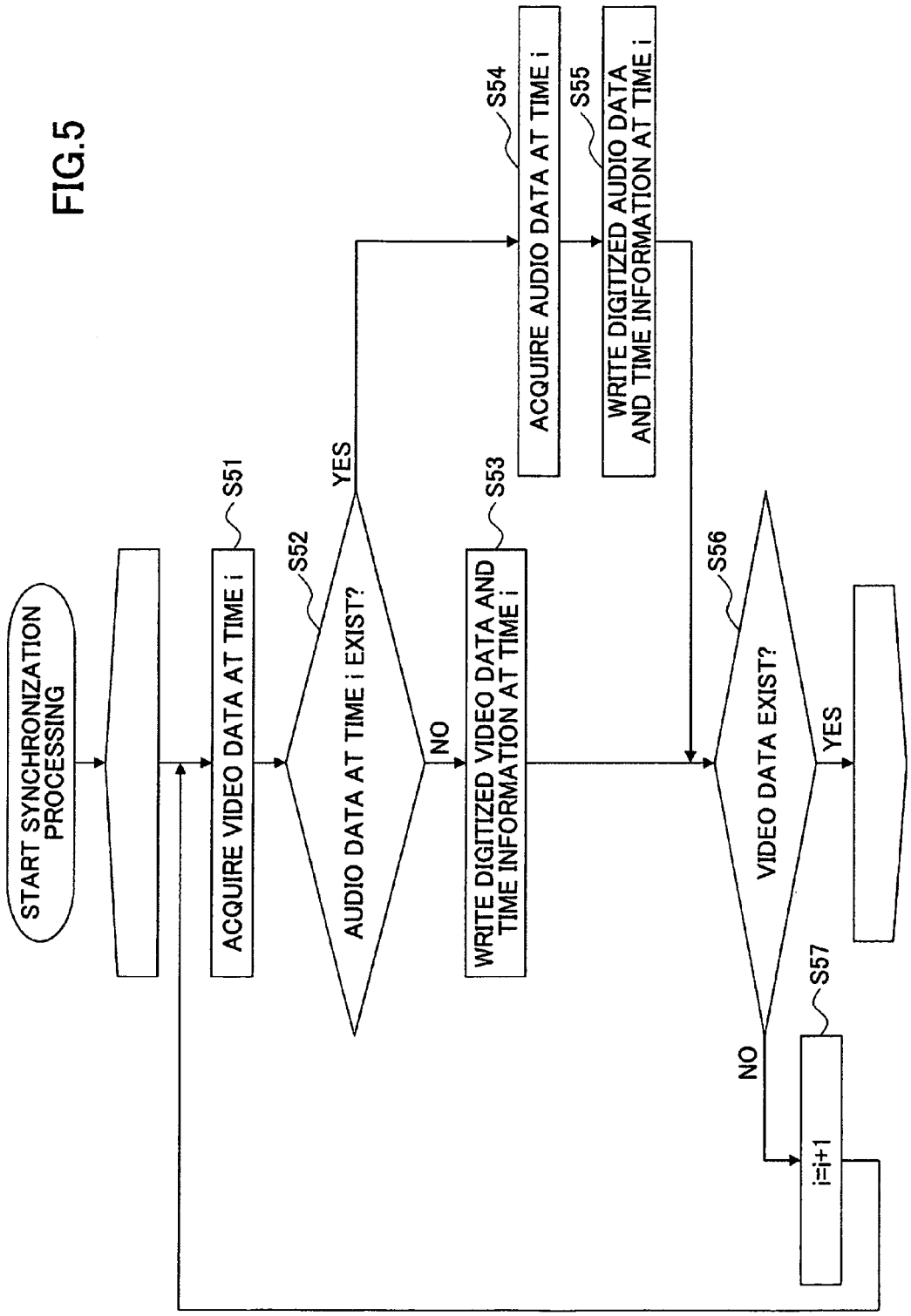

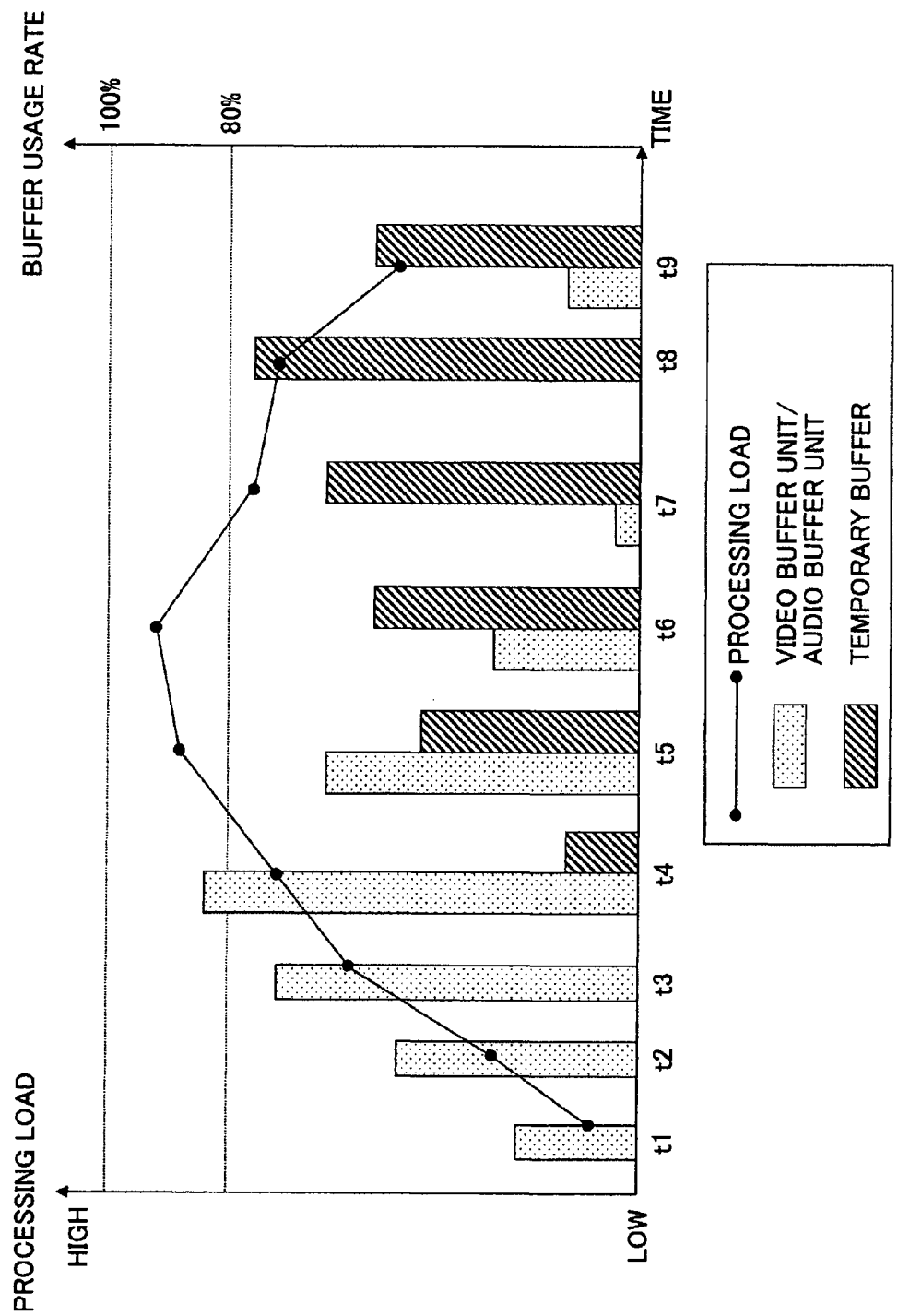

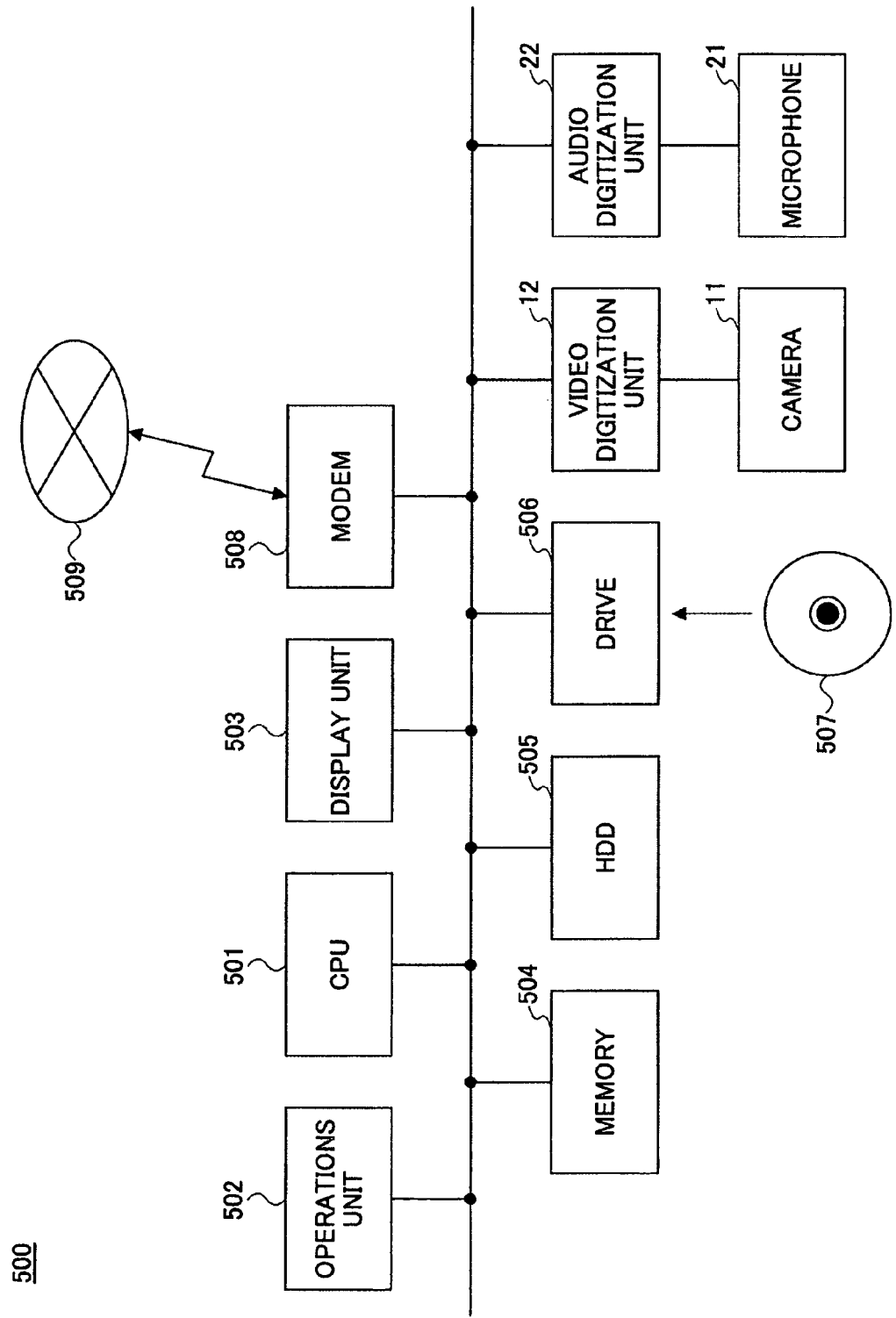

MOVING IMAGE RECORDING METHOD AND INFORMATION PROCESSING DEVICE

CROSS-REFERENCE TO RELATED APPLICATION

This application is a U.S. continuation application filed under 35 U.S.C. 111(a) claiming benefit under 35 U.S.C. 120 and 365(c) of PCT application JP2007/057259, filed on Mar. 30, 2007, the entire contents of which are incorporated herein by reference.

FIELD

The embodiment discussed herein is related to a moving image recording method and an information processing device.

BACKGROUND

Up until now, there have been discussed reproducing systems capable of separately recording an audio data file and a moving image data file and reproducing audio and moving image in synchronization with each other even without any dedicated processor having high processing performance.
Patent Document 1: Japanese Laid-Open Patent Publication No. 7-95522

SUMMARY

According to an aspect of the present invention, there is provided a moving image recording method including digitizing a video information item obtained by photographing and an audio information item obtained by recording to obtain a digitized video data item and a digitized audio data item each accompanied by a time information item, respectively; temporarily storing the digitized video data item accompanied by the time information item in such a manner as to separate the digitized video data item accompanied by the time information item into the time information item and the digitized video data item; temporarily storing the digitized audio data item accompanied by the time information item in such a manner as to separate the digitized audio data item accompanied by the time information item into the time information item and the digitized audio data item; and combining the time information item and the digitized video data item that are separately stored in the temporary storing the digitized video data item with the time information item and the digitized audio data item that are separately stored in the temporarily storing the digitized audio data item in synchronization with each other so as store the time information items, the digitized video data item, and the digitized audio data item in a predetermined format.

The object and advantages of the present invention will be realized and attained by means of the elements and combinations particularly pointed out in the claims.

It is to be understood that both the foregoing general description and the following detailed description are exemplary and explanatory and are not restrictive of the present invention, as claimed.

BRIEF DESCRIPTION OF DRAWINGS

FIG. 1 is a function block diagram of an information processing device that performs a moving image recording method according to an embodiment of the present invention;

FIG. 2C is a diagram for illustrating the flow of processing by the moving image recording method according to the embodiment of the present invention;

FIG. 5 is an operations flowchart for illustrating the flow of the time synchronization processing in the moving image recording method according to the embodiment of the present invention;

FIG. 11 is a diagram for illustrating the mode change along with a change in a processing load in the information processing device illustrated in FIG. 1; and FIG. 12 is a hardware block diagram of a computer in a case where the information processing device illustrated in FIG. 1 is implemented by the computer.

DESCRIPTION OF EMBODIMENTS

Figure 2A:
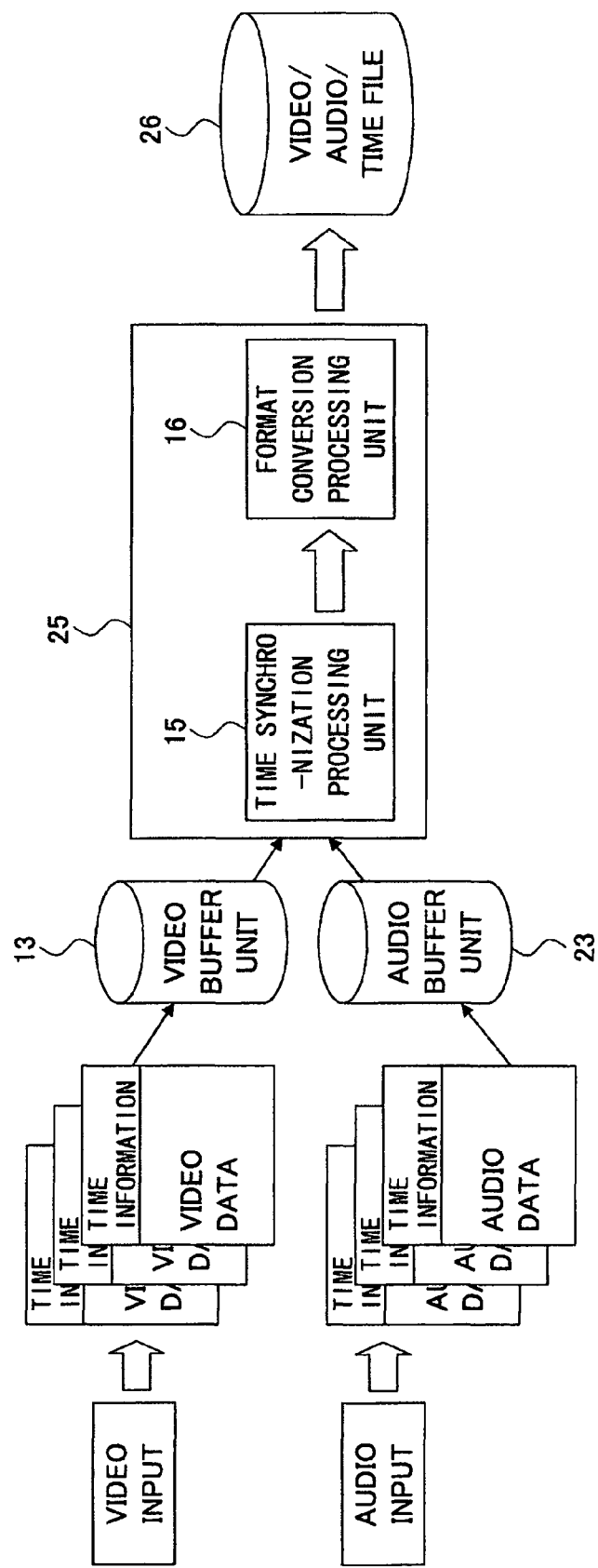
FIG. 2A is a diagram for illustrating the flow of processing by the moving image recording method according to the embodiment of the present invention.

When moving image information items photographed by cameras and recorded by microphones are digitized and recorded, MP4 is, for example, used as a recording format.

According to MP4, digitized video data items and digitized audio data items are recorded in order of time, and time information items corresponding to the digitized video data items and the digitized audio data items are also recorded in order of time.

Here, the time information items are composed of information items indicating times at which the video data items and the audio data items were recorded and composed of information items on the data sizes of the data items recorded at the corresponding times.

When moving images are digitized and recorded in such a format, video inputs from cameras are sorted at every predetermined time interval to provide video data items accompanied by corresponding time information items. In addition, audio inputs from microphones are sorted at every predetermined time interval to provide audio data items accompanied by corresponding time information items.

The video data items and the audio data items are temporarily stored in a video buffer unit and an audio buffer unit, respectively. Then, these data items are read and recorded in a video/audio/time file in MP4 format through time synchronization processing and format conversion processing.

When the moving images are reproduced from the video/audio/time file, information items on the data sizes of the video data items and the audio data items included in the time information items corresponding to times are read as control information items to reproduce the moving images with time. In accordance with the control information items thus read, the video data items and the audio data items are successively read and reproduced by amounts equivalent to the data sizes of specified data items. As a result, the video data items and the audio data items of the moving images initially taken and recorded at the same time are successively reproduced in synchronization with each other.

However, the time synchronization processing and the format conversion processing require a certain processing time. Therefore, when the video inputs or the audio inputs are processed at high speed and with high quality, the synchronization processing and the format conversion processing are not properly processed in time, which may result in the abandonment of input data items exceeding a tolerable processing amount.

Particularly, since information processing devices such as mobile phones required to be downsized and reduced in weight have limitation on enhancing data processing performance, there would be a high likelihood of such an abandonment of input data items.

The present invention has been made in view of the above circumstances and has an object of providing a moving image recording method capable of reliably recording moving images without abandoning input data items even if data items to be processed are large in amount. In addition, the present invention has an object of providing an information processing device for executing the moving image recording method.

An embodiment of the present invention is described in detail below with reference to the accompanying drawings.

FIG. 1 is a function block diagram of an information processing device, e.g., a cell phone having the configuration of executing a moving image recording method according to the embodiment of the present invention.

The information processing device has a camera 11 serving as a video input unit; a microphone 21 serving as an audio input unit; a video digitization unit 12 that digitizes video information items output from the camera 11; an audio digitization unit 22 that digitizes audio information items output from the microphone 21; a video buffer unit 13; an audio buffer unit 23; a temporary video buffer unit 14 that stores a video time information file 14a and a video data file 14b; a temporary audio buffer unit 24 that stores an audio time information file 24a and an audio data file 24b; a combining unit 25 that includes a time synchronization processing unit 15 and a format conversion processing unit 16 (see FIGS. 2A and 2B); and a video/audio/time file storage unit 26A that stores a video/audio/time file 26.

The video digitization unit 12 and the audio digitization unit 22 output, for example, digitized moving image information items photographed by the camera 11 and recorded by the microphone 21.

The video buffer unit 13 and the audio buffer unit 23 store digitized video data items and digitized audio data items output from the video digitization unit 12 and the audio digitization unit 22, respectively.

The combining unit 25 reads the digitized video data items and the digitized audio data items from the video buffer unit 13 and the audio buffer unit 23, respectively. In the combining unit 25, the time synchronization processing unit 15 applies time synchronization processing to these digitized video data items and the digitized audio data items, and the data format processing unit 16 applies data format processing to the digitized video data items and the digitized audio data items thus subjected to the time synchronization processing, thereby generating the video/audio/time file 26. The combining unit 25 stores the generated video/audio/time file 26 in the video/audio/time file storage unit 26A serving as a recording medium.

The temporary video buffer unit 14 and the temporary audio buffer unit 24 have the digitized video data items and the digitized audio data items temporarily stored therein in a high load mode described below.

FIG. 2A is a diagram for illustrating operations of the information processing device in a low load mode described below along with FIG. 1.

According to the embodiment of the present invention, as illustrated in FIG. 2A, video inputs from the camera 11 are sorted at every predetermined time interval to provide video data items accompanied by corresponding time information items. In addition, audio inputs from the microphone 21 are sorted at every predetermined time interval to provide audio data items accompanied by corresponding time information items. Then, the video data items and the audio data items are temporarily stored in the video buffer unit 13 and the audio buffer unit 23, respectively. The video data items and the audio data items are read and recorded in the video/audio/time file 26 in MP4 format through the time synchronization processing unit 15 and the format conversion processing unit 16 of the combining unit 25.

Figure 3:
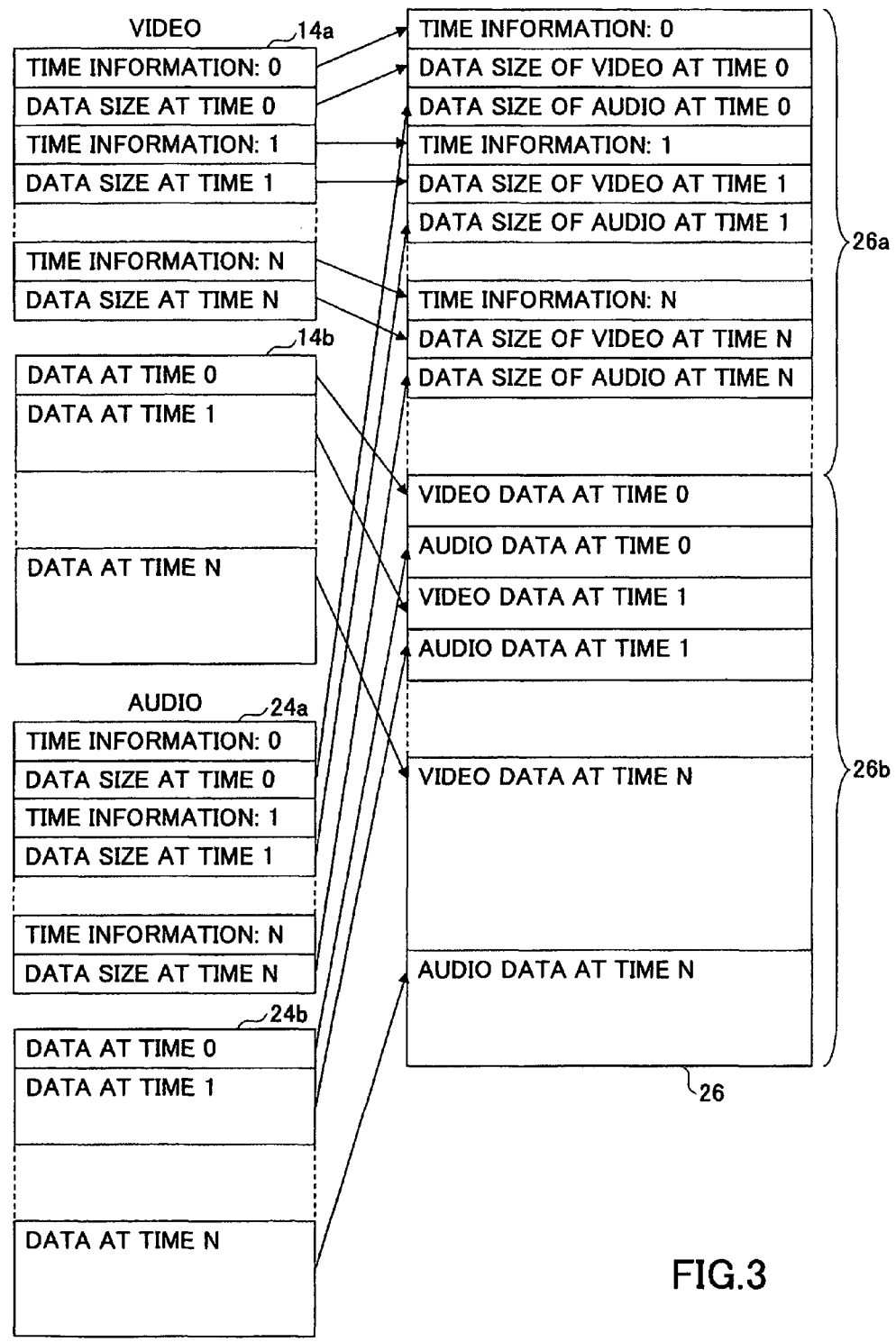
FIG. 3 is a diagram illustrating a state in which digitized video data items, time information items corresponding to the digitized video data items, digitized audio data items, and time information items corresponding to the digitized audio data items are combined with each other through time synchronization processing and format conversion processing and recorded in a video/audio/time file in the moving image recording method according to the embodiment of the present invention.

The video/audio/time file 26 has a data structure as illustrated on the right side of FIG. 3. When the video/audio/time file 26 reproduces moving images, the time information items for respective times stored in a time information section 26a at the upper stage of the video/audio/time file 26, i.e., the time information items on the video data items and the audio data items and information items on data sizes are read as control information items to reproduce the moving images with time. In accordance with the control information items thus read, the video data items and the audio data items of a video/audio data section 26b at the lower stage of the video/audio/time file 26 are successively read and reproduced by amounts equivalent to the data sizes of specified data items. As a result, the video data items and the audio data items of the moving images initially taken and recorded at the same time are successively reproduced in synchronization with each other.

However, the time synchronization processing unit 15 and the format conversion processing unit 16 require a certain processing time for the time synchronization processing and the format conversion processing, respectively. Therefore, when video inputs or audio inputs are processed at high speed and with high quality, the synchronization processing unit 15 and the format conversion processing unit 16 are not properly processed in time, which may result in the abandonment of input data items exceeding a tolerable processing amount.

Particularly, since information processing devices such as mobile phones required to be downsized and reduced in weight have limitations on enhancing data processing performance, there would be a high likelihood of such an abandonment of input data items.

Figure 2B:
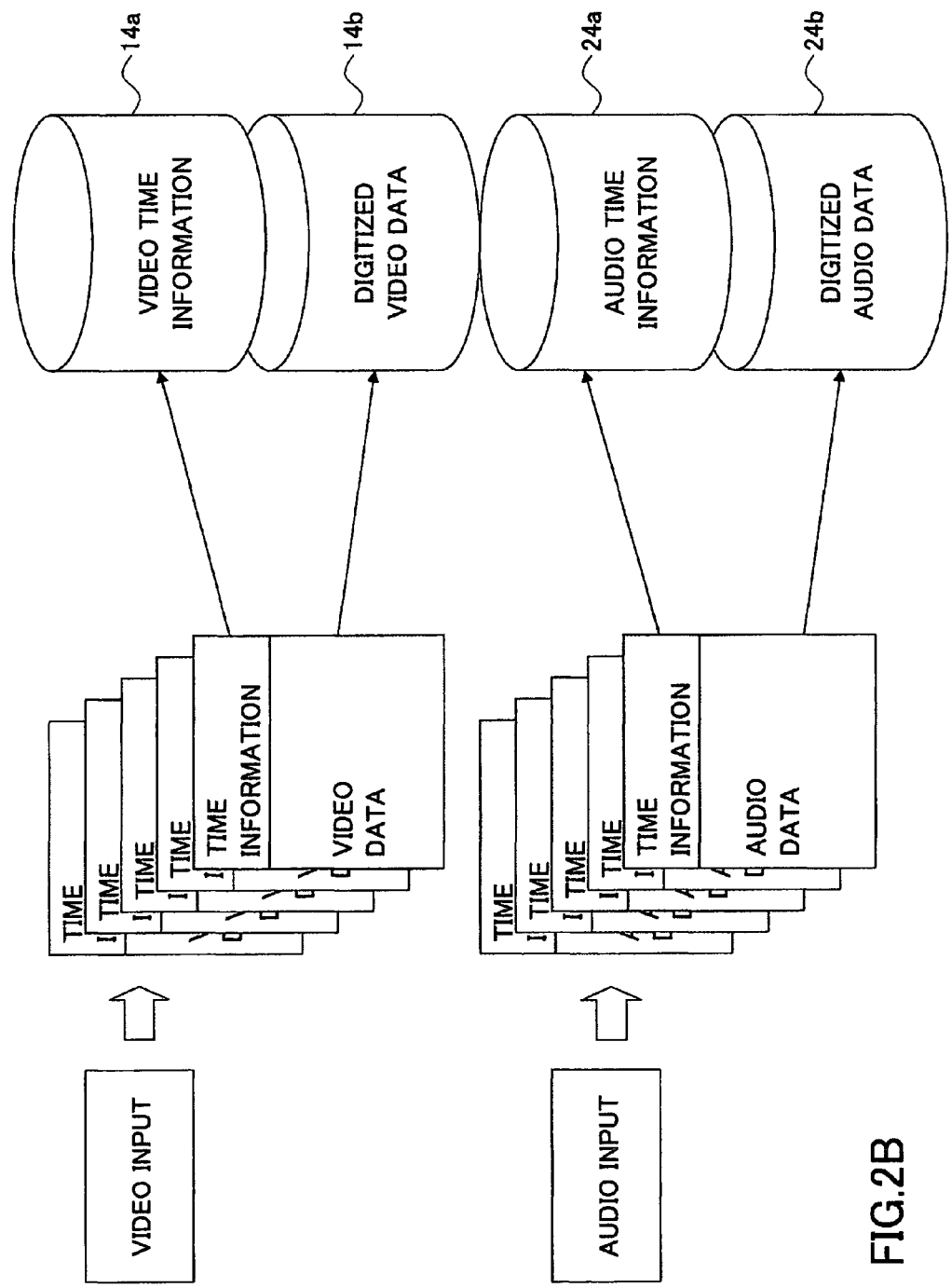
FIG. 2B is a diagram for illustrating the flow of processing by the moving image recording method according to the embodiment of the present invention.

According to the embodiment of the present invention, as illustrated in FIG. 2B, the video information items and the audio information items obtained by photographing and recording are first digitized in the high load mode. Then, without being subjected to the time synchronization processing by the time synchronization processing unit 15 and the format conversion processing by the format conversion processing unit 16, the video information items are recorded in the temporary video buffer unit 14 in such a manner as to be separated into video time information items 14a and digitized video data items 14b, and the audio information items are recorded in the temporary audio buffer unit 24 in such a manner as to be separated into audio time information items 24a and digitized audio data items 24b.

The processing in the high load mode does not include the time synchronization processing and the format conversion processing, but it includes only the process of recording the digitized data items in such a manner as to be separated into the time information items and the video data items and be separated into the time information items and the audio data items. Therefore, a required data processing amount can be reduced. Accordingly, input data items can be reliably recorded without being abandoned.

As illustrated in FIG. 2C, in a restoration mode described below, the digitized video data items 14b and the corresponding time information items 14a, and the digitized audio data items 24b and the corresponding time information items 24a, which are separately recorded, are successively read in order of time and subjected to the time synchronization processing by the time synchronization processing unit 15 and the format conversion processing by the format conversion processing unit 16. As a result, the video/audio/time file 26 of the data structure illustrated on the right side of FIG. 3 is obtained.

As described above, according to the embodiment of the present invention, when moving images are recorded in the high load mode, the digitized video data items are temporarily stored in such a manner as to be separated into the digitized video data items and the corresponding time information items, while the digitized audio data items are temporarily stored in such a manner as to be separated into the digitized audio data items and the corresponding time information items. Then, the data items thus temporarily stored are read and rearranged in chronological order and converted into a predetermined format. Unlike a related art in which input data items exceeding a tolerable processing amount are abandoned, the configuration according to the embodiment of the present invention enables the reliable storage of input data items without abandoning the input data items.

In other words, according to the related art, when moving images are recorded by, e.g., a cell phone and a microphone, digitized video data items, digitized audio data items, and time information items corresponding to the digitized video data items and the digitized audio data items are converted into a predetermined format (e.g., MP4 format) as a single file and recorded so that videos and audios are reproduced in synchronization with each other.

In this related art, when a large amount of high quality videos are processed by an information processing device such as a cell phone having relatively low processing performance, the time synchronization processing and the format conversion processing require a long processing time. As a result, input data items are not properly processed in time, which may result in the abandonment of the input data exceeding a tolerable processing amount.

In view of the above problem in the related art, the embodiment of the present invention is configured to record moving images in the low load mode in the following manner. At first, as illustrated in FIG. 2A, video information items output from the camera 11 and audio information items output from the microphone 21 are digitized by the video digitization unit 12 and the audio digitization unit 22, respectively, as in the case of the related art. Then, if it is determined that the storage rate of the video buffer unit 13 or the audio buffer unit 23 does not exceed 80% of its capacity and that the storage destinations of the present data items are not the temporary video buffer unit 14 and the temporary audio buffer unit 24, the digitized video data items and the digitized audio data items are buffered by the video buffer unit 13 that temporarily stores video data items and by the audio buffer unit 23 that temporarily stores audio data items, respectively. After that, the digitized video data items, the digitized audio data items, which are stored in the video buffer unit 13 and the audio buffer unit 23, respectively, and the time information items corresponding the digitized video data items and the digitized audio data items are converted into a predetermined format (such as MP4 format) and stored in the video/audio/time file storage unit 26A as the video/audio/time file 26.

Here, the low load mode described above refers to a mode in which the data amounts of the video information items input through the camera 11 and the video digitization unit 12 and the data amounts of the audio information items input through the microphone 21 and the audio digitization unit 22 do not exceed the performances of the time synchronization processing by the time synchronization processing unit 15 and the format conversion processing by the format conversion processing unit 16 of the combining unit 25. In other words, in the low load mode, input data items are not required to be abandoned.

If the data amounts per unit time of the digitized video data items output from the camera 11 or the data amounts per unit time of the digitized audio data items output from the microphone 21, i.e., frame rates, bit rates, etc., exceed a certain value, the information processing device changes to the high load mode.

Here, as a method for determining whether the data amounts per unit time of the digitized video data items output from the camera 11 or the data amounts per unit time of the digitized audio data items output from the microphone 21 exceed the certain value, data amounts stored in the video buffer unit 13 or the audio buffer unit 23 are taken into consideration. For example, if the storage data amount of a buffer memory constituting the video buffer unit 13 or the audio buffer unit 23 reaches 80% of the storage capacity of the buffer memory, it can be determined that the data amounts per unit time of the digitized video data items output from the camera 11 or the digitized audio data items output from the microphone 21 exceed the certain value.

As illustrated in FIG. 2B, when moving images are recorded in the high load mode, the video information items output from the camera 11 and the audio information items output from the microphone 21 are digitized by the video digitization unit 12 and the audio digitization unit 22, respectively, and then separately stored in the temporary video buffer unit 14 and the temporary audio buffer unit 24, respectively. In other words, the digitized video information items are recorded in such a manner as to be separated into a video time information file 14a and a video data file 14b, while the digitized audio information items are recorded in such a manner as to be separated into an audio time information file 24a and an audio data file 24b.

The video time information file 14a, the video data file 14b, the audio time information file 24a, and the audio data file 24b are described below.

In the video time information file 14a, times at which the video data items were recorded and the data sizes of the video data items recorded at the corresponding times are stored. In the video data file 14b, the video data items per se are stored. Furthermore, in the audio time information file 24a, times at which the audio data items were recorded and the data sizes of the audio data items recorded at the corresponding times are stored. In the audio data file 24b, the audio data items per se are stored.

Here, the digitized video data items obtained by digitizing the video information items output from the camera 11 and the digitized audio data items obtained by digitizing the audio information items output from the microphone 21 are accompanied by time information items, i.e., information items on times at which the information items were recorded and by information items on the data sizes of the information items in units of data items at a predetermined time interval.

Figure 4A:
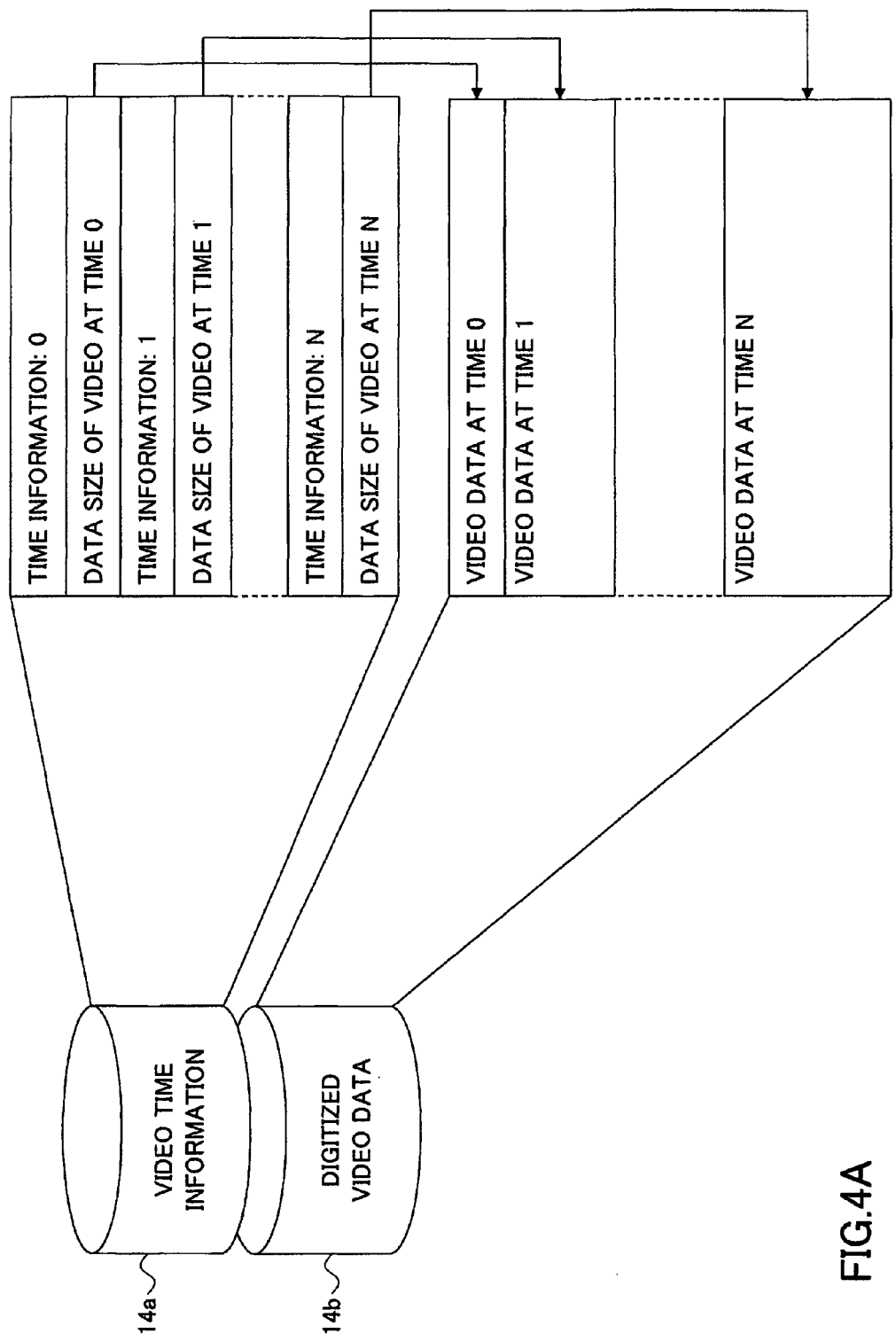
FIG. 4A is a diagram illustrating a state in which the digitized video data items and the time information items corresponding to the digitized video data items are separately recorded in the moving image recording method according to the embodiment of the present invention.

According to the embodiment of the present invention, the time information items are separated from the digitized video information items in the high load mode. As a result, as illustrated in FIG. 4A, the digitized video data items and the time information items corresponding to the digitized video data items are separately recorded in the temporary video buffer unit 14 as the video data file 14b and the video time information file 14a in order of time (i.e., times 0, 1, 2, . . . , N).

Figure 4B:
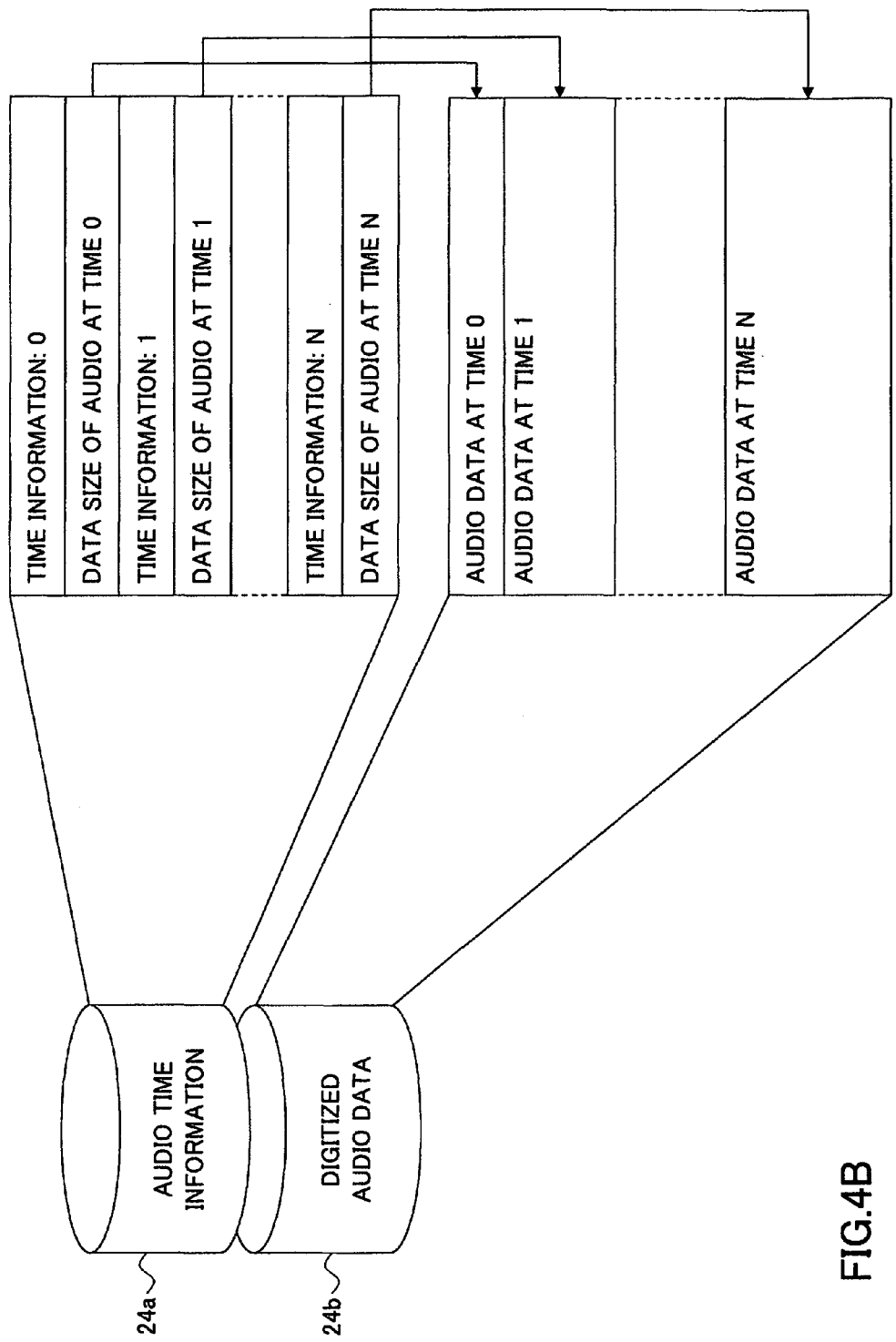
FIG. 4B is a diagram illustrating a state in which the digitized video data items and the time information items corresponding to the digitized video data items are separately recorded in the moving image recording method according to the embodiment of the present invention.

Similarly, the time information items are separated from the digitized audio information items corresponding to the predetermined time interval. As a result, as illustrated in FIG. 4B, the digitized audio data items and the time information items corresponding to the digitized audio data items are separately recorded in the temporary audio buffer 24 as the audio data file 24b and the audio time information file 24a in order of time (i.e., times 0, 1, 2, . . . , N).

In the high load mode, while the input data items are recorded in the temporary video buffer unit 14 and the temporary audio buffer unit 24, storage data items are successively read from the video buffer unit 13 and the audio buffer unit 23. Then, as illustrated in FIG. 2A, the read storage data items are subjected to the time synchronization processing by the time synchronization processing unit 15 and the format conversion processing by the format conversion processing unit 16 and recorded in the video/audio/time file storage unit 26A as the video/audio/time file 26.

If it is determined that the storage data amounts of the buffer memories whose storage capacity has temporarily exceeded 80% are reduced to less than a predetermined value as a result of the time synchronization processing and the format conversion processing subjected to the storage data items read from the video buffer unit 13 and the audio buffer unit 23, the information processing device changes to the restoration mode.

Here, the restoration mode refers to a mode in which the digitized video data items stored in the temporary video buffer unit 14 and the digitized audio data items stored in the temporary audio buffer unit 24 in the high load mode are subjected to the time synchronization processing by the time synchronization processing unit 15 and the format conversion processing by the format conversion processing 16 and stored in the video/audio/time file storage unit 26A as the video/audio/time file 26, thereby processing the storage data items of the temporary video buffer unit 14 and the temporary audio buffer unit 24.

Here, a case where the storage data amounts of the video buffer unit 13 and the audio buffer unit 23 are reduced to less than the predetermined value can be recognized, for example, as a case where the storage data amounts of the respective buffer memories constituting the video buffer unit 13 and the audio buffer unit 23 become less than 80% of their storage capacities or to a case where the storage data items of the video buffer unit 13 and the audio buffer unit 23 are completely processed.

In the restoration mode, as illustrated in FIG. 2C, the time synchronization processing unit 15 and the format conversion processing unit 16 start applying the time synchronization processing and the format conversion processing, respectively, to the digitized video data items recorded in the video data file 14b, the time information items corresponding to the digitized video data items recorded in the video time information file 14a, the digitized audio data items recorded in the audio data file 24b, and the time information items corresponding to the digitized audio data items recorded in the audio time information file 24a.

In the time synchronization processing by the time synchronization processing unit 15 and the format conversion processing by the format conversion processing unit 16, the video data file 14b in which the digitized video data items and the time information items corresponding to the video data items are separately recorded in order of time, the video time information file 14a in which the video time information items corresponding to the digitized video data items are separately recorded in order of time, the audio data file 24b in which the digitized audio data items are separately recorded in order of time, and the audio time information file 24a in which the audio time information items are separately recorded are rerecorded in chronological order to generate the video/audio/time file 26.

The time synchronization processing by the time synchronization processing unit 15 and the format conversion processing by the format conversion processing unit 16 are described below with reference to FIG. 3.

FIG. 3 is a diagram for illustrating the recorded information items of the video time information file 14a, the video data file 14b, the audio time information file 24a, and the audio data file 24b and illustrating the recorded information items of the video/audio/time file 26 obtained by applying the time synchronization processing and the format conversion processing to the video time information file 14a, the video data file 14b, the audio time information file 24a, and the audio data file 24b.

As illustrated in FIG. 3, in the video time information file 14a, the time information items indicating the times at which the video data items were recorded and the data sizes of the video data items recorded at the corresponding times are stored in order of time. In the video data file 14b, the corresponding video data items per se are stored in order of time.

Similarly, in the audio time information file 24a, the time information items indicating the times at which the audio data items were recorded and the data sizes of the audio data items recorded at the corresponding times are stored in order of time. In the audio data file 24b, the corresponding audio data items per se are stored in order of time.

In the time information section 26a at the upper stage of the video/audio/time information file 26, the time information items indicating the times at which the video data items and the audio data items were recorded and the data sizes of the video data items and the audio data items recorded at the corresponding times are stored in order of time. In the video/audio data section 26b at the lower stage of the video/audio/time information file 26, the corresponding video data items and the audio data items per se are alternately stored in order of time.

From among the video data file 14b in which the video data items per se are separately recorded in order of time (i.e., times 0, 1, 2, ..., N) by the time synchronization processing and the format conversion processing and video time information file 14a in which the time information items and the data sizes are separately recorded in order of time (i.e., times 0, 1, 2, ..., N) by the time synchronization processing and the format conversion processing, the video data items and the audio data items at the same time stored in the video data file 14b and the audio data file 24b, respectively, are alternately stored in the video/audio data section 26b of the video/audio/time file 26 in order of time. In other words, in the video/audio data section 26b of the video/audio/time file 26, the digitized video data item at time 0, the digitized audio data item at time 0, the digitized video data item at time 1, the digitized audio data item at time 1, ..., the digitized video data item at time N, and the digitized audio data item at time N are recorded in this order.

Similarly, in the time information section 26a of the video/audio/time file 26, the time information items at the same time stored in the video time information file 14a and the audio time information file 24a, respectively, are alternately recorded in order of time. In other words, the time information item representing time 0, the data size of the video data item, and the data size of the audio data item each serving as the time information item at time 0, the time information item representing time 1, the data size of the audio data item, and the data size of the audio data item each serving as the time information item at time 1, ..., and the time information item representing time N, the data size of the video data item, and the data size of the audio data item each serving as the time information item at time N are recorded in this order in the time information section 26a of the video/audio/time file 26.

When moving images are actually reproduced from the video/audio/time file 26 thus generated, the following processing is performed.

In other words, the time information items, the data sizes of the video data items at the corresponding times, and the data sizes of the audio data items at the corresponding times are successively read from the beginning of the time information section 26a of the video/audio/time file 26 in order of time. Then, the video data items and the audio data items at the corresponding times are read from the video/audio data section 26b of the video/audio/time file 26 by amounts equivalent to the data sizes of the specified video data items and the data sizes of the specified audio data items. Since the video data items and the audio data items are alternately stored for each time in the video/audio data section 26b in order of time, the data items of corresponding data amounts are successively read from the video/audio data section 26b in accordance with the data sizes of the video data items and the data sizes of the audio data items at the corresponding times stored in the time information section 26a. With this operation, the video data items and the audio data items at the corresponding times are successively alternately read and reproduced.

As described above, according to the embodiment of the present invention, in the high load mode, when respective data items are recorded, the time information items are separated from the digitized video data items and the digitized audio data items at every predetermined time interval without the application of the time synchronization processing and the format conversion processing to the digitized video data items and the digitized audio data items. Then, the digitized video data items, the time information items corresponding to the digitized video data items, the digitized audio data items, and the time information items corresponding to the digitized audio data items are separately recorded per se (the video time information file 14a, the video data file 14b, the audio time information file 24a, and the audio data file 24b). In the restoration mode, the video time information file 14a, the video data file 14b, the audio time information file 24a, and the audio data file 24b are subjected to the time synchronization processing and the format conversion processing so as to be combined with each other, thus generating the video/audio/time file 26. In other words, if input data amounts exceed the processing performance of the information processing device related to time synchronization processing and the format conversion processing, the information processing device changes to the high load mode. In this mode, the information processing device leaves the application of the time synchronization processing and the format conversion processing to input data items on the back burner and temporarily stores the input data items.

Therefore, the input data items exceeding the processing performance of the information processing device related to the time synchronization processing and the format conversion processing are not required to be abandoned. That is, the input data items can be reliably recorded.

Here, the data amounts per unit time of the digitized video data items and the digitized audio data items, i.e., bit frames, frame rates, etc., are different. Therefore, when the digitized video data items and the digitized audio data items are successively read from the video buffer unit 13 and the audio buffer unit 23, respectively, at a constant read speed, read digitized video data items and read digitized audio data items are not necessarily synchronized with each other. Accordingly, time synchronization processing is required to synchronize the digitized video data items and the digitized audio data items.

FIG. 5 is a flowchart for illustrating an operating procedure in the time synchronization processing by the time synchronization processing unit 15 according to the embodiment of the present invention. Note that the time synchronization processing at the time of reading storage data items from the video buffer unit 13 and the audio buffer unit 23 and the time synchronization processing at the time of reading storage data items from the temporary video buffer unit 14 and the temporary audio buffer unit 24 are described below one by one.

First, the time synchronization processing at the time of reading the storage data items from the video buffer unit 13 and the audio buffer unit 23 is described.

In step S51, the digitized video data item at time i (i=0 through N) is read from the video buffer unit 13 together with the time information item accompanied by time i.

Next, the digitized audio data item having the time information item indicating time i the same as the time of the video data item acquired from the video buffer unit 13 is searched for from the audio buffer unit 23.

Generally, the data amounts per unit time of the video information items obtained through the camera 11 and the data amounts per unit time of the audio information items obtained through the microphone 21 are different from each other. Particularly, the data amounts per unit time of the audio information items are smaller than the data amounts per unit time of the video information items in many cases. Therefore, all the digitized video data items do not necessarily have the corresponding digitized audio data items. This is because, when the data amounts per unit time of the audio information items are relatively small, the generation frequency of the digitized audio data items becomes smaller than that of the digitized video data items at the time of digitizing input data items. Accordingly, the digitized audio data item corresponding to the digitized video data item at certain time may not exist. In this case, the flow proceeds to "No" in step S52.

If the flow proceeds to "No" in step S52, the digitized video data item and the time information item corresponding to the digitized video data items read in step S51 are written in the video/audio/time file 26 in step S53 (i.e., the time information item, the data size of the video data item, and the video data item at time i in the data structure on the right side of FIG. 3).

If the corresponding digitized audio data item at time i is found ("Yes" in step S52), it is read from the audio buffer unit 23 together with the time information item accompanied by the corresponding digitized audio data item in step S54. Then, in step S55, the corresponding digitized audio data item and the time information item are written in the video/audio/time file 26 (i.e., the time information item, the data size of the audio data item, and the audio data item at time i in the data structure on the right side of FIG. 3).

In step S56, a determination is made as to whether all the digitized video data items of the video data file 14 have been processed (i.e., whether the digitized video data item at time N has been processed).

If all the digitized video data items have been processed ("Yes" in S56), the time synchronization processing is completed. If all the digitized video data items have not been processed ("No" in S56), the flow proceeds to step S57 where 1 is added to the time variable i. Then, the flow returns to step S51 to repeat the above processing. The video/audio/time file 26 is thus generated.

Next, the time synchronization processing at the time of reading the storage data items from the temporary video buffer unit 14 and the temporary audio buffer unit 24 is described.

In step S51, the digitized video data item at time i (i=0 through N) is read from the video data file 14b stored in the temporary video buffer unit 14, while the time information item and the data size of the video data item each serving as the video time information item at the same time i are read from the video time information file 14a.

Then, in step S52, the audio time information item or the digitized audio data item at the same time is searched for from the audio time information file 24a or the audio data file 24b stored in the temporary audio buffer unit 24.

If the audio time information item or the digitized audio data item at the same time i is not found ("No" in step S52), the digitized video data item and the time information item acquired in step S51 are written in the video/audio/time file 26 (i.e., the time information item, the data size of the video data item, and the video data item at time i in the data structure on the right side of FIG. 3).

On the other hand, if the audio time information item or the digitized audio data item at the same time is found ("Yes" in step S52), the corresponding audio time information item and the digitized audio data item are read from the audio time information file 24a and the audio data file 24b, respectively, stored in the temporary audio buffer unit 24b in step S54. In step S55, the read audio time information item and the digitized audio data item are written in the video/audio/time file 26 (i.e., the time information, the data size of the audio data item, and the audio data item at time i in the data structure on the right side of FIG. 3).

In step S56, a determination is made as to whether all the time information items and all the digitized video data items in the video time information file 14 and the video data file 14b, respectively, stored in the video temporary buffer 14 have been processed (i.e., whether the time information item and the digitized video data item at time N have been processed).

If all the time information items and all the digitized video data items have been processed ("Yes" in step S56), the time synchronization processing is completed. If all the time information items and all the digitized video data items have not been processed ("No" in step S56), the flow proceeds to step S57 where 1 is added to the time variable i. Then, the flow returns to step S51 to repeat the above processing. The video/audio/time file 26 is thus generated.

Next, with reference to FIGS. 1 and 6 through 11, the flow of moving image recording operations in the information processing device, particularly, a mode change operation between the low load mode, the high load mode, and the restoration mode is described.

Figure 6:
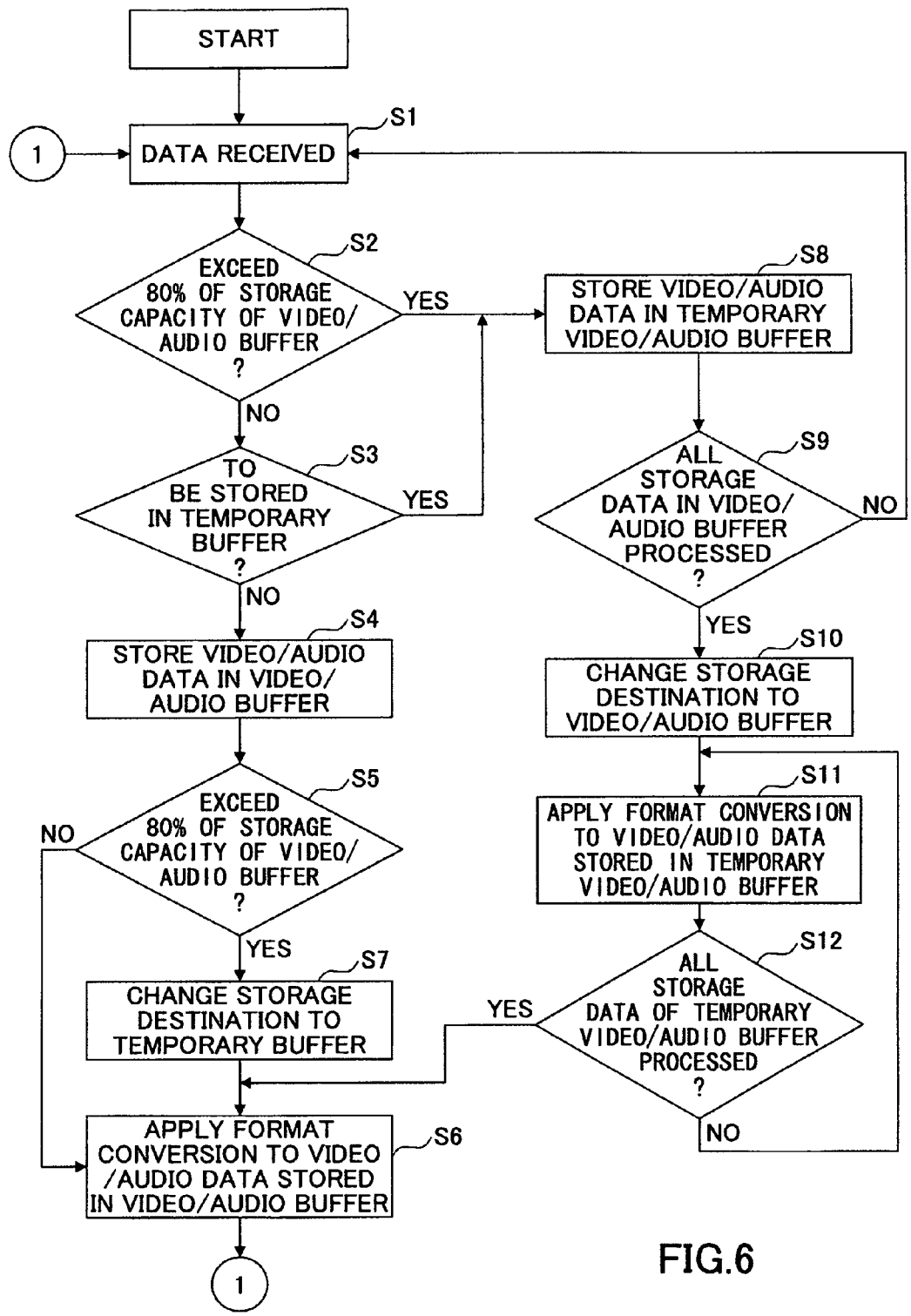
FIG. 6 is an operations flowchart for illustrating operations related to a mode change in the information processing device illustrated in FIG. 1.

FIG. 6 is an operations flowchart paying attention to the flow of the moving image recording operations in the information processing device, particularly, to the mode change operation.

When recording operations of moving images, i.e., photographing and recording operations by the user, are started, video information items and audio time information items are output from the camera 11 and the microphone 21, respectively. The output video information items and the audio time information items are digitized by the video digitization unit 12 and the audio digitization unit 22, respectively. Thus, the digitized video data items accompanied by the time information items and the digitized audio data items accompanied by the time information items are generated.

In step S2, a determination is made as to whether the storage data amount of the video buffer unit 13 or the audio buffer unit 23 exceeds 80% of its storage capacity.

If it is determined that the storage data amount has not exceeded 80% of the storage capacity ("No" in step S2), a determination is made as to whether the storage destinations of the present digitized video data items and the digitized audio data items are the temporary video buffer unit 14 and the temporary audio buffer unit 24 in step S3.

If it is determined that the storage destinations are not the temporary video buffer unit 14 and the temporary audio buffer unit 24 ("No" in step S3), i.e., if it is determined that the storage destinations are the video buffer unit 13 and the audio buffer unit 23, the digitized video data items and the digitized audio data items are stored in the video buffer unit 13 and the audio buffer unit 23, respectively, so as to be accompanied by the corresponding time information items (step S4).

In step S5, a determination is made as to whether the storage data amount of the video buffer unit 13 or the audio buffer unit 23 exceeds 80% of its storage capacity.

If it is determined that the storage data amount does not exceed the storage capacity ("No" in step S5), the time synchronization processing unit 15 and the data format conversion processing unit 16 of the combining unit 25 apply the time synchronization processing and the format conversion processing, respectively, to the digitized video data items accompanied by the time information items and the digitized audio data items accompanied by the time information items stored in the video buffer unit 13 and the audio buffer unit 23, thereby generating the video/audio/time file 26 (step S6).

The processing in steps S1 through S6 is repeatedly performed until it is determined that the storage data amount of the video buffer unit 13 or the audio buffer unit 23 exceeds 80% of the storage capacity in step S2 or step S5.

The above state refers to the low load mode.

Figure 7:
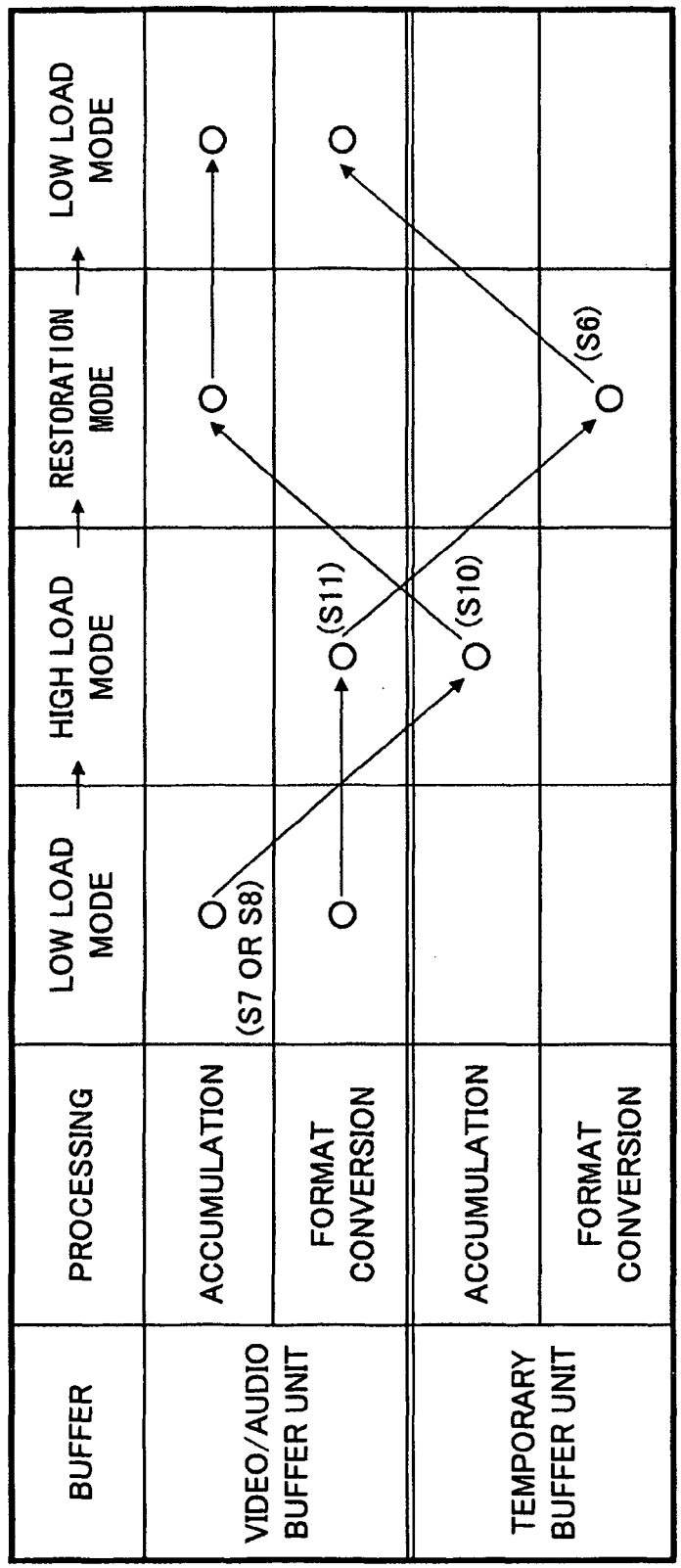
FIG. 7 is a diagram for illustrating the mode change in the information processing device illustrated in FIG. 1.
Figure 8:
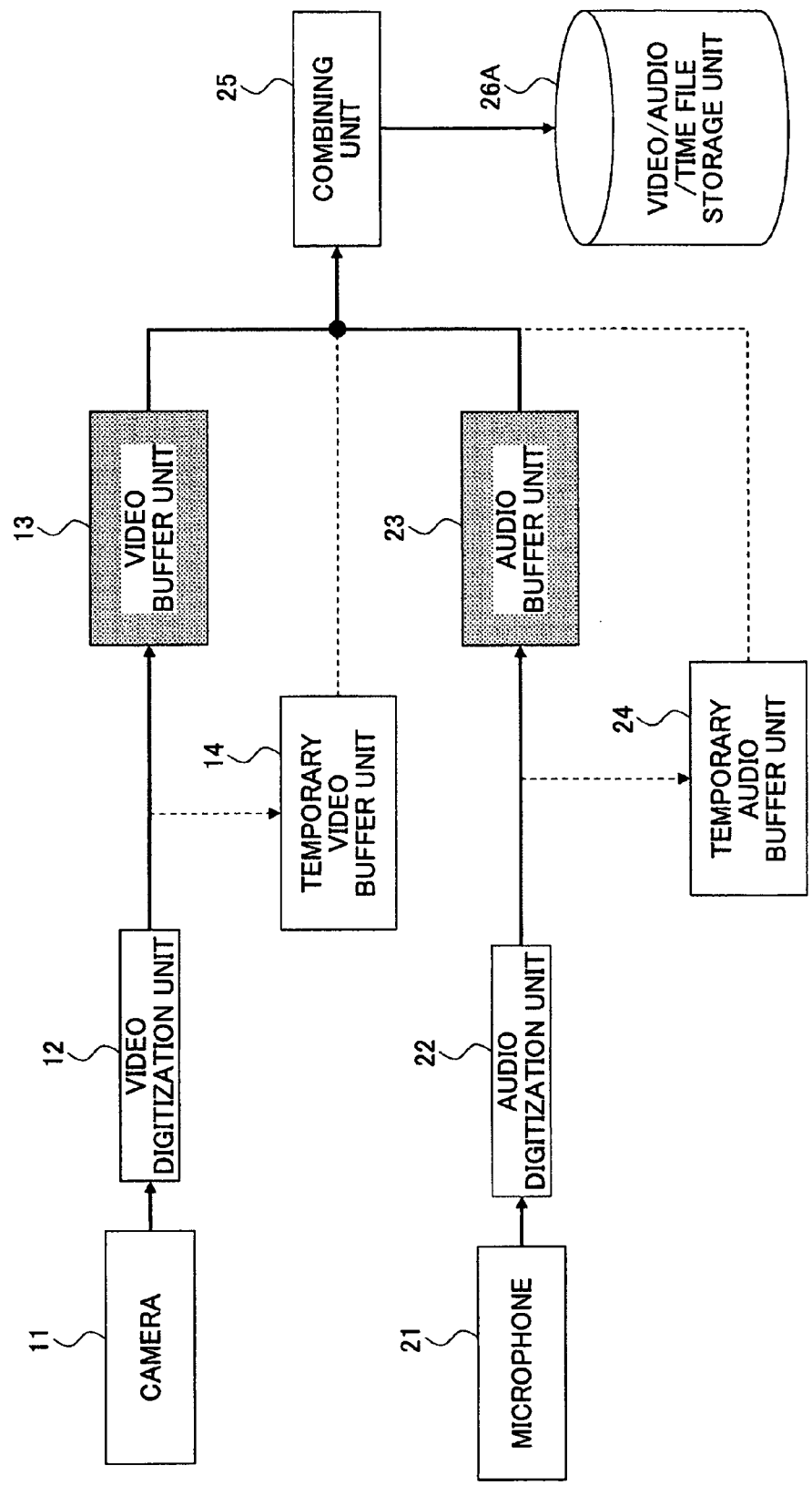
FIG. 8 is a diagram for illustrating the operations in a low load mode in the information processing device illustrated in FIG. 1.

As illustrated in FIGS. 7 and 8, in the low load mode, the digitized video data items accompanied by the time information items and the digitized audio data items accompanied by the time information items are accumulated in the video buffer unit 13 and the audio buffer unit 23, respectively. At the same time, the processing by the time synchronization processing unit 15 and the processing by the format conversion processing unit 16 of the combining unit 25 are applied to the digitized video data items and the digitized audio data items stored in the video buffer unit 13 and the audio buffer unit 23, respectively, to generate the video/audio/time file 26. The generated video/audio/time file 26 is stored in the video/audio/time file storage unit 26A.

FIG. 7 illustrates a state in which the storage destinations of the digitized video data items and the digitized audio data items output from the video digitization unit 12 and the audio digitization unit 22, respectively, are changed from the video buffer unit 13 and the audio buffer unit 23 to the temporary video buffer unit 14 and the temporary audio buffer unit 24 when the modes are changed from the low load mode to the restoration mode through the high load mode. Furthermore, FIG. 7 illustrates a state in which the storage places of the data items to be processed when the digitized video data items and the digitized audio data items thus stored are processed by the combining unit 25 are changed from the video buffer unit 13 and the audio buffer unit 23 to the temporary video buffer unit 14 and the temporary audio buffer unit 24.

FIG. 8 is a diagram for illustrating the operations of the information processing device along with FIG. 1.

As illustrated in times t1 through t4 in FIG. 11, when a processing load, i.e., the data amounts per unit time of the digitized video data items and the digitized audio data items output from the video digitization unit 12 and the audio digitization unit 22, respectively, gradually increase, the processing by the time synchronization processing unit 15 and the processing by the format conversion processing unit 16 are not properly processed in time. As a result, the storage data amounts of the video buffer unit 13 and the audio buffer unit 23 gradually increase.

Figure 9:
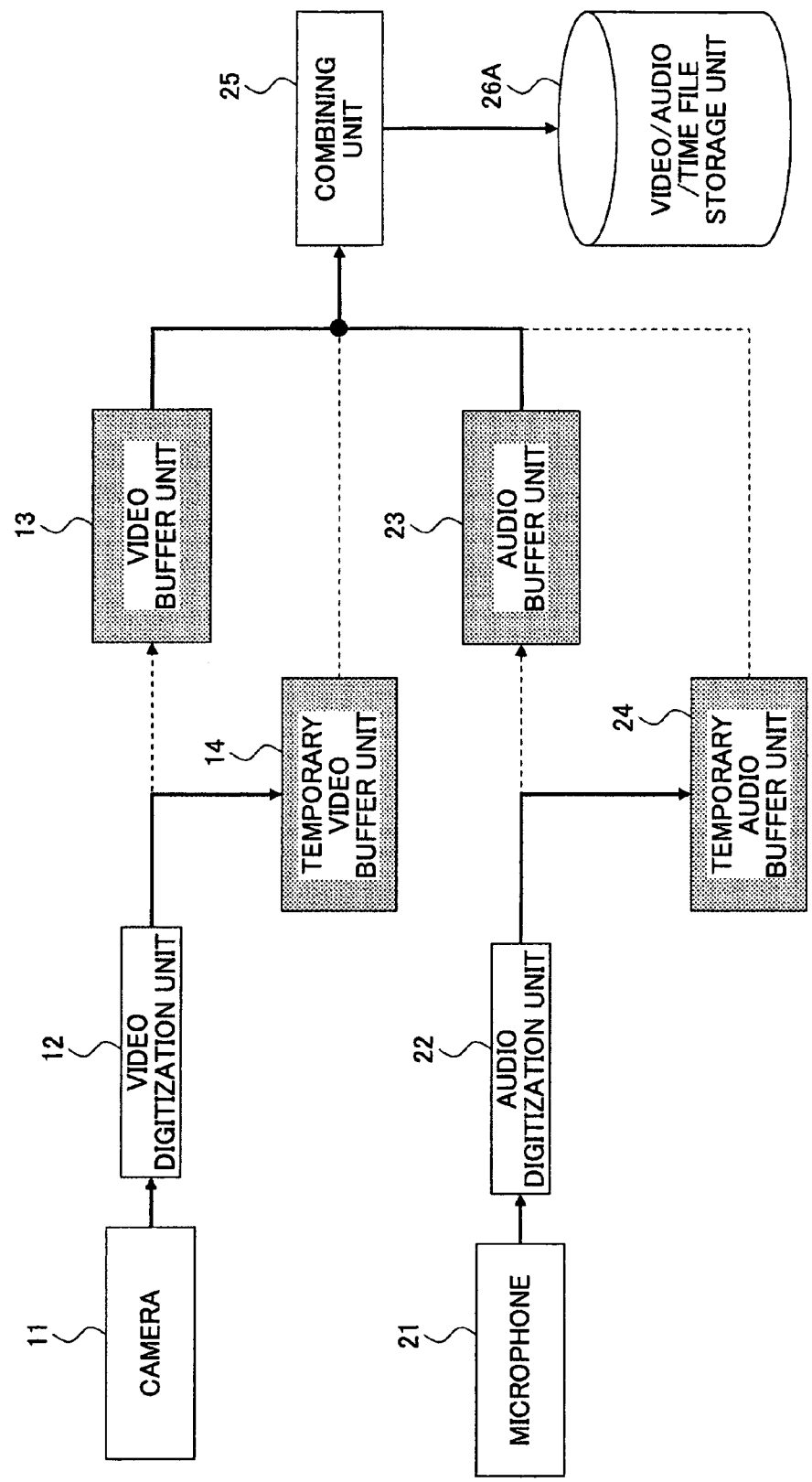
FIG. 9 is a diagram for illustrating the operations in a high load mode in the information processing device illustrated in FIG. 1.

FIG. 9 is a diagram for illustrating the operations of the information processing device in FIG. 1 in the high load mode. FIG. 11 is a diagram for illustrating the mode change between the low load mode, the high load mode, and the restoration mode along with the change of the processing load in the information processing device in FIG. 1.

If the storage data amount of the video buffer unit 13 or the audio buffer unit 23 exceeds 80% of its storage capacity (time t4 in FIG. 11), the flow in FIG. 6 proceeds to "Yes" in step S2, and the storage destinations of the digitized video data items and the digitized audio data items are changed from the video buffer unit 13 and the audio buffer unit 23 to the temporary video buffer unit 14 and the temporary audio buffer unit 24 in step S8.

Also, as the flow of another operation, the flow proceeds to "Yes" in step S5 in FIG. 6, and the storage destinations of the digitized video data items and the digitized audio data items are changed from the video buffer unit 13 and the audio buffer unit 23 to the temporary video buffer unit 14 and the temporary audio buffer unit 24 in step S7. At the same time, in step S6, the time synchronization processing by the time synchronization processing unit 15 and the format conversion processing by the format conversion processing unit 16 are continuously applied to the digitized video data items accompanied by the time information items and the digitized audio data items accompanied by the time information items stored in the video buffer unit 13 and the audio buffer unit 23, respectively.

In other words, if it is determined that the flow proceeds to "Yes" in step S2 or S5 in FIG. 6, the information processing device changes to the high load mode.

As illustrated in FIGS. 7 and 9, in the high load mode, the digitized video data items accompanied by the time information items and the digitized audio data items accompanied by the time information items output from the video digitization unit 12 and the audio digitization unit 22, respectively, are temporarily stored in the temporary video buffer unit 14 and the temporary audio buffer unit 24, respectively.

At that time, the time information items are separated from the digitized video data items accompanied by the time information items and the digitized audio data items accompanied by the time information items. That is, the video time information file 14a, the video data file 14b, the audio time information file 24a, and the audio data file 24b are separately recorded (see FIGS. 2B, 4A, and 4B).

At the same time, the time synchronization processing by the time synchronization processing unit 15 and the format conversion processing by the format conversion processing unit 16 are continuously applied to the digitized video data items accompanied by the time information items and the digitized audio data items accompanied by the time information items stored in the video buffer unit 13 and the audio buffer unit 23, respectively.

Thus, the digitized video data items, the digitized audio data items, and the time information items corresponding to the digitized video data items and the digitized audio data items are stored in the video/audio/time file storage unit 26A as the video/audio/time file 26 as in the case of the low load mode.

As illustrated in FIGS. 7 and 9, in the high load mode, the storage destinations of the digitized video data items and the digitized audio data items are changed from the video buffer unit 13 and the audio buffer unit 23 to the temporary video buffer unit 14 and the temporary audio buffer unit 24. Therefore, the storage data items in the video buffer unit 13 and the audio buffer unit 23 no longer increase, while the data items stored in the video buffer unit 13 and the audio buffer unit 23 are gradually reduced by the processing of the combining unit 25 (times t4 through t7 in FIG. 11).

Referring back to FIG. 6, when the flow proceeds to "Yes" in step S2 and then the storage destinations of the digitized video data items and the digitized audio data items are changed from the video buffer unit 13 and the audio buffer unit 23 to the temporary video buffer unit 14 and the temporary audio buffer unit 24 in step S8, a determination is made as to whether all the storage data items in the video buffer unit 13 and the audio buffer unit 23 have been processed in step S9.

As described above, in the high load mode, while the digitized video data items, the digitized audio data items, and the time information items corresponding to the digitized video data items and the digitized audio data items are stored in the temporary video buffer unit 14 and the temporary audio buffer unit 24, respectively, the time synchronization processing by the time synchronization processing unit 15 and the format conversion processing unit by the format conversion processing unit 16 are applied to the digitized video data items accompanied by the time information items and the digitized audio data items accompanied by the time information items stored in the video buffer unit 13 and the audio buffer unit 23, respectively. As the storage data items of the video buffer unit 13 and the audio buffer unit 23 are successively processed as described above, the storage data amounts (i.e., usage rates of the buffers) of the video buffer unit 13 and the audio buffer unit 23 gradually reduce as illustrated in times t4 through t7 in FIG. 11. As a result, if all the storage data items of the video buffer unit 13 and the audio buffer unit 23 have been processed, it is determined that the flow proceeds to "Yes" in step S9.

Note that the criterion of determining the flow in step S9 is not limited to the "time at which all the storage data items of the video buffer unit 13 and the audio buffer unit 23 have been processed," but it may be based on the "time at which the storage data amounts of the video buffer unit 13 and the audio buffer unit 23 have been reduced to a predetermined threshold (e.g., 80% of the storage capacity)."

If it is determined that the flow proceeds to "No" in step S9, i.e., if the storage data items still remain in the video buffer unit 13 and the audio buffer unit 23, the flow returns to step S1. Then, the processing in steps S1, S2, S8, and S9 is repeatedly performed until it is determined that the flow proceeds to "Yes" in step S9.

Furthermore, as the flow of another operation to change to the high load mode, the flow proceeds to "Yes" in step S5 as described above. In addition, in step S7, the storage destinations of the digitized video data items and the digitized audio data items are changed from the video buffer unit 13 and the audio buffer unit 23 to the temporary video buffer unit 14 and the temporary audio buffer unit 24. Moreover, in step S6, the time synchronization processing by the time synchronization processing unit 15 and the format conversion processing by the format conversion processing unit 16 are continuously applied to the digitized video data items accompanied by the time information items and the digitized audio data items accompanied by the time information items stored in the video buffer unit 13 and the audio buffer unit 23, respectively.

In this case, the flow returns to step S1. Then, the flow proceeds to step S2, and it is determined that the flow proceeds to "Yes" in step S2. In addition, in step S8, the storage destinations of the digitized video data items and the digitized audio data items are changed from the video buffer unit 13 and the audio buffer unit 23 to the temporary video buffer unit 14 and the temporary audio buffer unit 24. The following processing is the same as the processing described above. The processing in steps S1, S2, S8, and S9 is repeatedly performed until it is determined that the flow proceeds to "Yes" in step S9

On the other hand, if it is determined that the flow proceeds to "Yes" in step S9, i.e., if all the storage data items in the video buffer unit 13 and the audio buffer unit 23 have been processed by the time synchronization processing by the time synchronization processing unit 15 and the format conversion processing by the format conversion processing unit 16, i.e., if the state at time t8 is established in FIG. 11, the digitized video data items accompanied by the time information items and the digitized audio data items accompanied by the time information items output from the video digitization unit 12 and the audio digitization unit 22, respectively, are stored in the video buffer unit 13 and the audio buffer unit 23, respectively, so as to be accompanied by the corresponding time information items in step S10.

In step S11, the time synchronization processing by the time synchronization processing unit 15 and the format conversion processing by the format conversion processing unit 16 are applied to the video time information file 14a, the video data file 14b, the audio time information file 24a, and the audio data file 24b separately stored in the temporary video buffer unit 14 and the temporary audio buffer unit 24 as described above.

This state refers to the restoration mode as illustrated in FIG. 2C.

Figure 10:
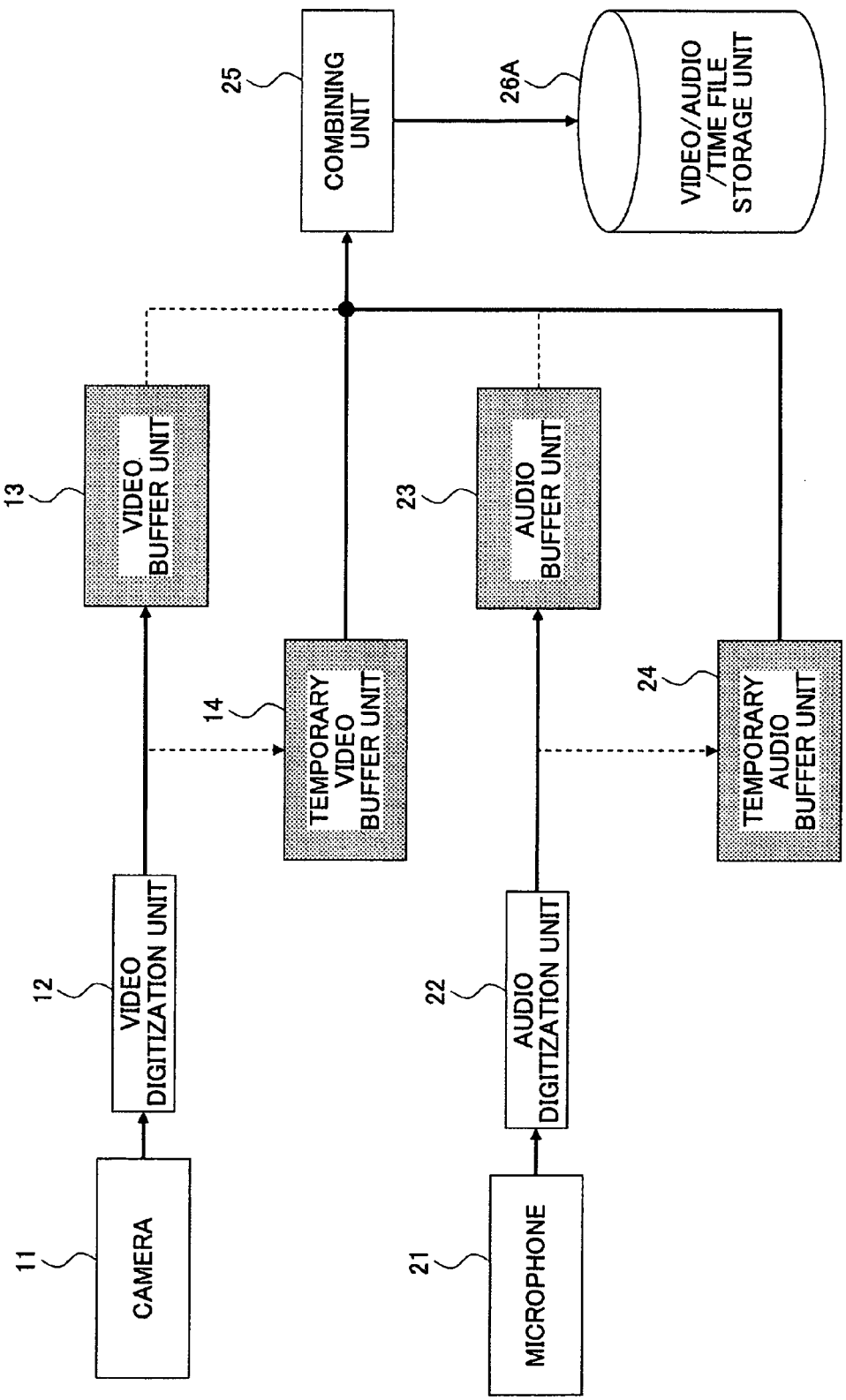
FIG. 10 is a diagram for illustrating the operations in a restoration mode in the information processing device illustrated in FIG. 1.

FIG. 10 is a diagram for illustrating the flow of processing data items in the restoration mode.

In the restoration mode, as in the case of the low load mode, the digitized video data items accompanied by the time information items and the digitized audio data items accompanied by the time information items output from the video digitization unit 12 and the audio digitization unit 22, respectively, are stored in the video buffer unit 13 and the audio buffer unit 23 so as to be accompanied by the time information items, while the time synchronization processing by the time synchronization processing unit 15 and the format conversion processing by the format conversion processing unit 16 are applied to the video time information file 14a, the video data file 14b, the audio time information file 24a, and the audio data file 24b separately stored in the temporary video buffer unit 14 and the temporary audio buffer unit 24 (see FIG. 7).

In the restoration mode, the storage destinations of the digitized video data items and the digitized audio data items output from the video digitization unit 12 and the audio digitization unit 22, respectively, are changed to the video buffer unit 13 and the audio buffer unit 23. Therefore, as illustrated in times t8 and t9 in FIG. 11, the storage data amounts of the temporary video buffer unit 14 and the temporary audio buffer unit 24 are gradually reduced by the processing of the storage data items of the temporary video buffer unit 14 and the temporary audio buffer unit 24 through the time synchronization processing unit 15 and the format conversion processing unit 16 of the combining unit 25.

At that time, the storage data amounts of the video buffer unit 13 and the audio buffer unit 23 are gradually increased when the digitized video data items accompanied by the time information items and the digitized audio data items accompanied by the time information items output from the video digitization unit 12 and the audio digitization unit 22, respectively, are stored as described above.

Referring back to FIG. 6, a determination is made as to whether all the storage data items of the temporary video buffer unit 14 and the temporary audio buffer unit 24 have been processed by the time synchronization processing unit 15 and the format conversion processing unit 16 of the combining unit 25 in step S12.

As described above, the storage data amounts of the temporary video buffer unit 14 and the temporary audio buffer unit 24 are gradually reduced when the storage data items of the temporary video buffer unit 14 and the temporary audio buffer unit 24 are processed by the time synchronization processing unit 15 and the format conversion processing unit 16 of the combining unit 25. As a result, if the storage data amounts of the temporary video buffer unit 14 and the temporary audio buffer unit 24 become zero, the flow proceeds to "Yes" in step S12.

Note that the criterion of determining the flow in step S12 is not limited to the "time at which the storage data amounts of the temporary video buffer unit 14 and the temporary audio buffer unit 24 become zero" as described above, but it may be based on the "time at which the storage data amounts of the temporary video buffer unit 14 and the temporary audio buffer unit 24 are reduced to a predetermined threshold (e.g., 80% of the storage capacity)."

The processing in steps S11 and S12 is repeatedly performed until the storage data amounts of the temporary video buffer unit 14 and the temporary audio buffer unit 24 become zero and it is determined that the flow proceeds to "Yes" in step S12, whereby the restoration mode is maintained.

If the storage data amounts of the temporary video buffer unit 14 and the temporary audio buffer unit 24 become zero and it is determined that the flow proceeds to "Yes" in step S12, the flow proceeds to step S6. Then, as illustrated in FIG. 7, objects to be processed by the time synchronization processing unit 15 and the format conversion processing unit 16 of the combining unit 25 are changed to the digitized video data items accompanied by the time information items and the digitized audio data items accompanied by the time information items stored in the video buffer unit 13 and the audio buffer unit 23, respectively, as described above.

As a result, the information processing device returns to the low load mode based on FIG. 8.

As illustrated in FIG. 11, if the processing load, i.e., the data amounts per unit time of the digitized video data items and the digitized audio data items output from the video digitization unit 12 and the audio digitization unit 22, respectively, are reduced between the high load mode at the times t1 through t9 and the following restoration mode, the information processing device returns to the restoration mode in FIG. 8. Then, as described above, the low load mode is maintained until it is determined that the flow proceeds to "Yes" in step S2 or S5 in accordance with the increase in the processing load.

On the other hand, if the processing load, i.e., the data amounts per unit time of the digitized video data items and the digitized audio data items output from the video digitization unit 12 and the audio digitization unit 22, respectively, are not reduced but remain at high level between the high load mode at the times t1 through t9 and the following restoration mode, the information processing device returns to the low load mode as illustrated in FIG. 8. Then, when the storage data items of the video buffer unit 13 and the audio buffer unit 23 are not properly processed in time by the time synchronization processing unit 15 and the format conversion processing unit 16 of the combining unit 25, the storage data amounts of the video buffer unit 13 and the audio buffer unit 23 exceed 80% of the storage capacity and it is determined that the flow proceeds to "Yes" in step S2 or S5. Then, the information processing device changes to the high load mode in FIG. 9. Subsequently, the processing of "high load mode→restoration mode→low load mode→high load mode→ . . . " is repeatedly performed until the processing load is reduced as illustrated in FIG. 7.

According to the embodiment of the present invention, the following advantages are obtained.

In other words, when audio information items and time information items are recorded, it is required to perform the time synchronization processing and the format conversion processing that search for digitized video data items and digitized audio data items at the same time to ensure synchronization between them so as to simultaneously record the digitized video data items and the digitized audio data items in the same file. In this case, with an improvement in the quality of videos and audios to be recorded, the time synchronization processing and the format conversion processing require a certain processing time, which may result in a limitation in processing performance.

According to the embodiment of the present invention, in the high load mode, the digitized video data items and the digitized audio data items are separately stored in the different files, and the time information items corresponding to the digitized video data items and the digitized audio data items are stored in the different files. In other words, the digitized video data items and the digitized audio data items are successively recorded without being subjected to the time synchronization processing by which the digitized video data items and the digitized audio data items are synchronized with each other.

As a result, even if the improvement in the quality of videos and audios to be recorded is achieved, it is possible to reliably record input data items regardless of the processing performance of a device related to the time synchronization processing.

Furthermore, according to the embodiment of the present invention, the digitized video data items and the digitized audio data items separately recorded in the high load mode are read and subjected to the time synchronization processing and the format conversion processing. As a result, it is possible to store the video/audio/time file in a specified format in a recording medium.

FIG. 12 is a block diagram illustrating a configuration example of a computer for describing a case in which the information processing device according to the embodiment of the present invention is implemented by the computer.

As illustrated in FIG. 12, the computer 500 has a CPU 501 that issues instructions constituting specified programs to execute various operations; an operations unit 502 that is composed of a keyboard, a mouse, and the like and through which the user inputs operating contents or data items; a display unit 503 that is composed of a CRT, a liquid crystal display, or the like and displays processing processes, processing results, or the like by the CPU 501 to the user; a memory 504 that is composed of a ROM, a RAM, and the like and that stores programs, data items, and the like executed by the CPU 501 and serves as a work area; a hard disk unit 505 that stores programs, data items, and the like; a CD-ROM drive 506 that loads programs and data items from the outside through a CD-ROM 507 serving as a medium; and a modem 508 that downloads programs from outside servers via a communication network 509 such as the Internet and a LAN.

In addition, the computer 500 has the camera 11, the microphone 21, and the video digitization unit 12 and the audio digitization unit 22 that digitize the video information items and the audio information items, respectively, output from the camera 11 and the microphone 21 to generate the digitized video data items and the digitized audio data items.

The computer 500 loads or downloads the program having instructions for causing the CPU 501 to execute the processing by the information processing device according to the embodiment of the present invention through the CD-ROM 507 serving as a medium or through the communication network 509 serving as a medium. Then, the computer 500 installs the loaded or downloaded program in the hard disk unit 505 and appropriately loads the same in the memory 504 so as to be executed by the CPU 501. As a result, the computer 500 implements the information processing device according to the embodiment of the present invention.

All examples and conditional language recited herein are intended for pedagogical purposes to aid the reader in understanding the present invention and the concepts contributed by the inventor to furthering the art, and are to be construed as being without limitation to such specifically recited examples and conditions, and the organization of such examples in the specification does not relate to a showing of the superiority or inferiority of the present invention. Although the embodiment of the present invention has been described in detail, it should be understood that the various changes, substitutions, and alterations could be made hereto without departing from the spirit and scope of the present invention.

What is claimed is:
1. A moving image recording method comprising:
digitizing a video information item obtained by photographing and an audio information item obtained by recording to obtain a digitized video data item and a digitized audio data item each accompanied by a time information item, respectively;

separating the digitized video data item accompanied by the time information item into the time information item and the digitized video data item and temporarily storing the time information item and the digitized video data item separately;

separating the digitized audio data item accompanied by the time information item into the time information item and the digitized audio data item and temporarily storing the time information item and the digitized audio data item separately; and combining the time information item and the digitized video data item that are separately stored in the temporary storing the time information and the digitized video data item with the time information item and the digitized audio data item that are separately stored in the temporarily storing the time information and the digitized audio data item in synchronization with each other so as to store the time information items, the digitized video data item, and the digitized audio data item in a predetermined format.

2. The moving image recording method according to claim 1, having a first predetermined mode, a second predetermined mode and a third predetermined mode, wherein the first predetermined mode executes processing of combining the digitized video data item obtained in the digitizing and accompanied by the time information item with the digitized audio data item obtained in the digitizing and accompanied by the time information item in synchronization with each other and storing the digitized video data item accompanied by the time information item and the digitized audio data item accompanied by the time information item in the predetermined format, the second predetermined mode executes processing of separating the digitized video data item obtained in the digitizing and accompanied by the time information item into the time information item and the digitized video data item and temporarily storing the time information item and the digitized video data item separately in the separating and temporarily storing the time information item and the digitized video data item and separating the digitized audio data item obtained in the digitizing and accompanied by the time information item into the time information item and the digitized audio data item and temporarily storing the time information item and the digitized audio data item separately in the separating and temporarily storing the time information item and the digitized audio data item, and the third predetermined mode executes processing of combining the time information item and digitized video data item that are separately stored in the temporarily storing the time information item and the digitized video data item with the time information item and the digitized audio data item that are separately stored in the temporarily storing the time information item and the digitized audio data item in synchronization with each other and storing the time information items, the digitized video data item, and the digitized audio data item.

3. The moving image recording method according to claim 2, wherein buffers are provided to temporarily store the digitized video data item obtained in the digitizing and accompanied by the time information item and the digitized audio data item obtained in the digitizing and accompanied by the time information item, respectively, the first predetermined mode executes the processing of reading the digitized video data item stored in the corresponding buffer and accompanied by the time information item and the digitized audio data item stored in the corresponding buffer and accompanied by the time information item, combining the digitized video data item accompanied by the time information item and the digitized audio data item accompanied by the time information item in synchronization with each other, and storing the digitized video data item accompanied by the time information item and the digitized audio data item accompanied by the time information item in the predetermined format, the first predetermined mode changes to the second predetermined mode when data storage amounts of the buffers reach a first predetermined value, the second predetermined mode changes to the third predetermined mode when the data storage amounts of the buffers reach a second predetermined value smaller than the first predetermined value by processing in the first predetermined mode, and the third predetermined mode changes to the first predetermined mode when a storage amount in the temporarily storing the digitized video data item and the temporarily storing the digitized audio data item reaches a third predetermined value.

4. The moving image recording method according to claim 2, wherein buffers are provided to temporarily store the digitized video data item obtained in the digitizing and accompanied by the time information item and the digitized audio data item obtained in the digitizing and accompanied by the time information item, respectively, the first predetermined mode executes the processing of reading the digitized video data item accompanied by the time information item and the digitized audio data item accompanied by the time information item from the corresponding buffers, combining the digitized video data item accompanied by the time information item and the digitized audio data item accompanied by the time information item in synchronization with each other, and storing the digitized video data item accompanied by the time information item and the digitized audio data item accompanied by the time information item in the predetermined format, simultaneously with the digitizing of the video information item obtained by the photographing and the audio information item obtained by the recording to obtain the digitized video data item accompanied by the time information item and the digitized audio data item accompanied by the time information item, respectively, the second predetermined mode executes the processing of reading the digitized video data item accompanied by the time information item and the digitized audio data item accompanied by the time information item from the corresponding buffers, combining the digitized video data item accompanied by the time information item and the digitized audio data item accompanied by the time information item in synchronization with each other, and storing the digitized video data item accompanied by the time information item and the digitized audio data item accompanied by the time information item in the predetermined format, simultaneously with the separating and temporarily storing the time information item and the digitized video data item of separating the digitized video data item obtained in the digitization and accompanied by the time information item into the time information item and the digitized video data item and temporarily storing the time information item and the digitized video data item separately and simultaneously with the separating and temporarily storing the time information item and the digitized audio data item of separating the digitized audio data item obtained in the digitizing and accompanied by the time information item into the time information item and the digitized audio data item and temporarily storing the time information item and the digitized audio data item separately, and the third predetermined mode executes the processing of combining the time information item and the digitized video data item that are separately stored in the temporarily storing the time information item and the digitized video data item with the time information item and the digitized audio data item that are separately stored in the temporarily storing the time information item and the digitized audio data item in synchronization with each other and storing the time information items, the digitized video data item, and the digitized audio data item, simultaneously with the digitizing of the video information item obtained by the photographing and the audio information item obtained by the recording to obtain the digitized video data item accompanied by the time information item and the digitized audio data item accompanied by the time information item, respectively.

5. The moving image recording method according to claim 1, wherein in the digitizing, the video information item obtained by the photographing and the audio information item obtained by the recording are sorted at every predetermined time interval to generate the digitized video data item and the digitized audio data item at every predetermined time interval, respectively, and the time information item is composed of an information item on a data size of the corresponding digitized video data item and the corresponding digitized audio data item at every predetermined time interval, in the temporarily storing the time information item and the digitized video data item, the digitized video data item at every predetermined time interval is recorded in order of time and the time information item corresponding to the digitized video data item is recorded in order of time, in the temporarily storing the time information item and the digitized audio data item, the digitized audio data item at every predetermined time interval is recorded in order of time and the time information item corresponding to the digitized audio data item is recorded in order of time, and in the combining, the digitized video data item at every predetermined time interval temporarily stored in the temporarily storing the time information item and the digitized video data item and the digitized audio data item at every predetermined time interval temporarily stored in the temporarily storing the time information item and the digitized audio data item are successively alternately recorded at every corresponding time interval, and the time information items corresponding to the digitized video data item and the time information item corresponding to the digitized audio data item are successively alternately recorded at every corresponding time interval.

6. An information processing device comprising:

a digitization unit that digitizes a video information item obtained by photographing and an audio information item obtained by recording to obtain a digitized video data item and a digitized audio data item each accompanied by a time information item, respectively;

a temporary video data item storage unit that separates the digitized video data item accompanied by the time information item into the time information item and the digitized video data item and temporarily stores the time information item and the digitized video data item separately;

a temporary audio data item storage unit that separates the digitized audio data item accompanied by the time information item into the time information item and the digitized audio data item and temporarily stores the time information item and the digitized audio data item separately; and a time-information-item-separated format conversion unit that combines the time information item and the digitized video data item that are separately stored by the temporary video data item storage unit with the time information item and the digitized audio data item that are separately stored by the temporary audio data item storage unit in synchronization with each other and stores the time information items, the digitized video data item, and the digitized audio data item in a predetermined format.

7. The information processing device according to claim 6, further comprising a time-information-item-unseparated format conversion unit that combines the digitized video data item obtained by the digitization unit and accompanied by the time information item with the digitized audio data item obtained by the digitization unit and accompanied by the time information item in synchronization with each other and stores the time information items, the digitized video data item, and the digitized audio data item in the predetermined format, wherein in a first predetermined mode, the time-information-item-unseparated format conversion unit combines the digitized video data item obtained by the digitization unit and accompanied by the time information item with the digitized audio data item obtained by the digitization unit and accompanied by the time information item in synchronization with each other and stores the time information items, the digitized video data item, and the audio data item in the predetermined format, in a second predetermined mode, the temporary video data item storage unit separates the digitized video data item obtained by the digitization unit and accompanied by the time information item into the time information item and the digitized video data item and temporarily stores the time information item and the digitized video data item separately, and the temporary audio data item storage unit separates the digitized audio data item obtained by the digitization unit and accompanied by the time information item into the time information item and the digitized audio data item and temporarily stores the time information item and the digitized audio data item separately, and in a third predetermined mode, the time-information-item-separated format conversion unit combines the time information item and digitized video data item that are separately stored by the temporary video data item storage unit with the time information item and the digitized audio data item that are separately stored by the temporary audio data item storage unit in synchronization with each other and stores the time information items, the temporary video data item, and the temporary audio data item.

8. The information processing device according to claim 7, further comprising
- buffers provided to temporarily store the digitized video data item obtained by the digitization unit and accompanied by the time information item and the digitized audio data item obtained by the digitization unit and accompanied by the time information item, respectively, wherein
- in the first predetermined mode, the time-information-item-unseparated format conversion unit reads the digitized video data item stored in the corresponding buffer and accompanied by the time information item and the digitized audio data item stored in the corresponding buffer and accompanied by the time information item, combines the digitized video data item accompanied by the time information item and the digitized audio data item accompanied by the time information item in synchronization with each other, and stores the digitized video data item accompanied by the time information item and the digitized audio data item accompanied by the time information item in the predetermined format,
- the first predetermined mode changes to the second predetermined mode when data storage amounts of the buffers reach a first predetermined value,
- the second predetermined mode changes to the third predetermined mode when the data storage amounts of the buffers reach a second predetermined value smaller than the first predetermined value by processing of the time-information-item-unseparated format conversion unit, and
- the third predetermined mode changes to the first predetermined mode when a storage amount of the temporary video data item storage unit and the temporary audio data item storage unit reaches a third predetermined value by processing of the time-information-item-separated format conversion unit.

9. The information processing device according to claim 7, wherein
- buffers provided to temporarily store the digitized video data item obtained in the digitization unit and accompanied by the time information item and the digitized audio data item obtained in the digitization unit and accompanied by the time information item, respectively,
- in the first predetermined mode, an operation by the time-information-item-unseparated format conversion unit is executed, in which the digitized video data item accompanied by the time information item and the digitized audio data item accompanied by the time information item are read from the corresponding buffers, combined in synchronization with each other, and stored in the predetermined format, simultaneously with an operation by the digitization unit in which the video information item obtained by the photographing and the audio information item obtained by the recording are digitized to obtain the digitized video data item accompanied by the time information item and the digitized audio data item accompanied by the time information item, respectively,
- in the second predetermined mode, an operation by the time-information-item-unseparated format conversion unit is executed, in which the digitized video data item accompanied by the time information item and the digitized audio data item accompanied by the time information item are read from the corresponding buffers, combined in synchronization with each other, and stored in the predetermined format, simultaneously with an operation by the temporary video data storage unit in which the digitized video data item obtained by the digitization unit and accompanied by the time information item is separated into the time information item and the digitized video data item and the time information item and the digitized video data item are temporarily stored separately, and simultaneously with an operation by the temporary audio data storage unit in which the digitized audio data item obtained by the digitization unit and accompanied by the time information item is separated into the time information item and the digitized audio data item and the time information item and the digitized audio data item are temporarily stored separately, and
- in the third predetermined mode, an operation by the time-information-item-separated format conversion unit is executed, in which the time information item and the digitized video data item that are separately stored by the temporary video data storage unit and the time information item and the digitized audio data item that are separately stored by the temporary audio data storage unit are combined in synchronization with each other and stored in the predetermined format, simultaneously with an operation by the digitization unit in which the video information item obtained by the photographing and the audio information item obtained by the recording are digitized to obtain the digitized video data item accompanied by the time information item and the digitized audio data item accompanied by the time information item, respectively.

10. The information processing device according to claim 6, wherein
- the digitization unit sorts the video information item obtained by the photographing and the audio information item obtained by the recording at every predetermined time interval to generate the digitized video data item and the digitized audio data item at every predetermined time interval, respectively, and the time information item is composed of an information item on a data size of the digitized video data item and the digitized audio data item at every predetermined time interval,
- the temporary video data item storage unit records the digitized video data item at every predetermined time interval in order of time and records the time information item corresponding to the digitized video data item in order of time,
- the temporary audio data item storage unit records the digitized audio data item at every predetermined time interval in order of time and records the time information item corresponding to the digitized audio data item in order of time, and
- the time-information-item-separated format conversion unit successively alternately records the digitized video data item at every predetermined time interval temporarily stored by the temporary video data item storage unit and the digitized audio data item at every predetermined time interval temporarily stored by the temporary audio data item storage unit at every corresponding time interval, and successively alternately records the time information item corresponding to the digitized video data item and the time information item corresponding to the digitized audio data item at every corresponding time interval.

* * * * *